United States Patent
Asahi

(10) Patent No.: US 6,724,953 B2
(45) Date of Patent: Apr. 20, 2004

(54) OPTICAL CROSS-CONNECT APPARATUS, AND ITS SIGNAL MONITORING METHOD

(75) Inventor: Koji Asahi, Tokyo (JP)

(73) Assignee: NEC Corporation, Tokyo (JP)

( * ) Notice: Subject to any disclaimer, the term of this patent is extended or adjusted under 35 U.S.C. 154(b) by 318 days.

(21) Appl. No.: 09/803,095

(22) Filed: Mar. 12, 2001

(65) Prior Publication Data

US 2001/0022875 A1 Sep. 20, 2001

(30) Foreign Application Priority Data

Mar. 13, 2000 (JP) ....................... 2000-069099

(51) Int. Cl.[7] .................................................. G02B 6/35
(52) U.S. Cl. ........................................................ 385/17
(58) Field of Search ............................ 385/16, 17, 24, 385/31; 398/9, 12, 19, 79, 82

(56) References Cited

U.S. PATENT DOCUMENTS

| | | | |
|---|---|---|---|
| 6,266,460 B1 | * | 7/2001 | Doerr ......................... 385/16 |
| 6,532,089 B1 | * | 3/2003 | Asahi ......................... 359/128 |
| 6,538,783 B1 | * | 3/2003 | Stephens ...................... 359/127 |
| 2002/0141688 A1 | * | 10/2002 | Chavin ......................... 385/17 |

FOREIGN PATENT DOCUMENTS

| | | |
|---|---|---|
| JP | A 5-122745 | 5/1993 |
| JP | 5-183509 | 7/1993 |
| JP | A 5-260541 | 10/1993 |
| JP | A 2000-69510 | 3/2000 |
| JP | A 2000-232420 | 8/2000 |

OTHER PUBLICATIONS

Chungpen Fan, "*Examining an Integrated Solution to Optical Transport Networking* ", Wavelength Division Multiplexing: The First eve European meeting place for WDM Systems, Network, Marketing & Engineering Professionals), Nov. 1997, London, pp. 18–23.

* cited by examiner

*Primary Examiner*—John D. Lee
*Assistant Examiner*—Sarah Song
(74) *Attorney, Agent, or Firm*—Young & Thompson

(57) ABSTRACT

To provide an optical cross-connect apparatus capable of, even in the case where a light switch becomes large-sized, supervising quality and management information of light signals passing through inside the apparatus with low-cost configuration. For each of the light signals inputted from n pieces of input port, path setting in a branch connection state is performed in order following a control signal from a control section by connecting any one of n pieces of output port with a predetermined supervising port at n×m light SW. Quality and management information are detected from light signals outputted from a supervising output port at a light signal detecting section, and the quality and the management information are supervised at a light signal supervising section.

16 Claims, 19 Drawing Sheets

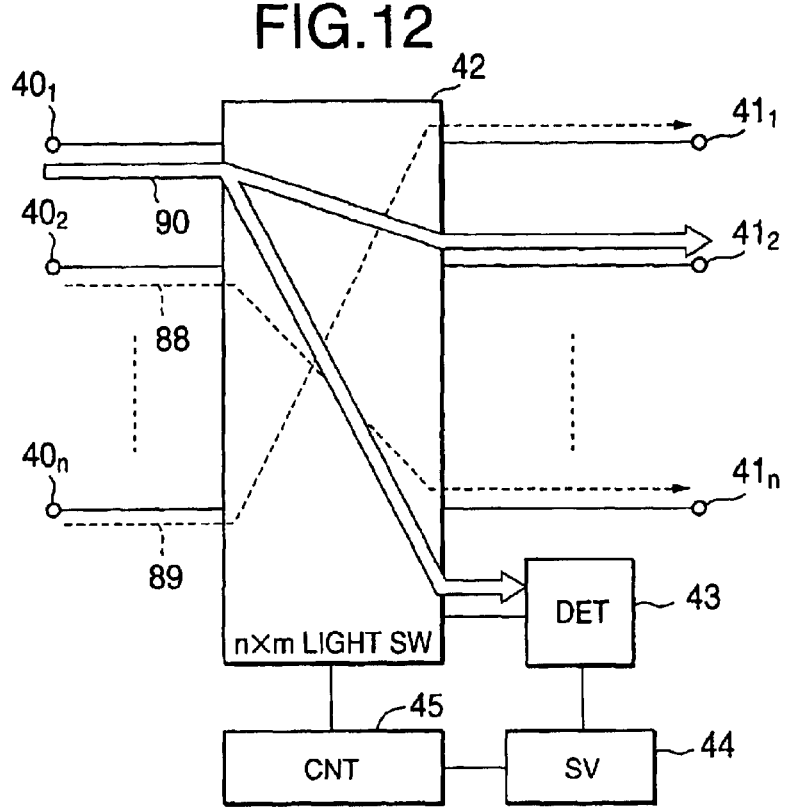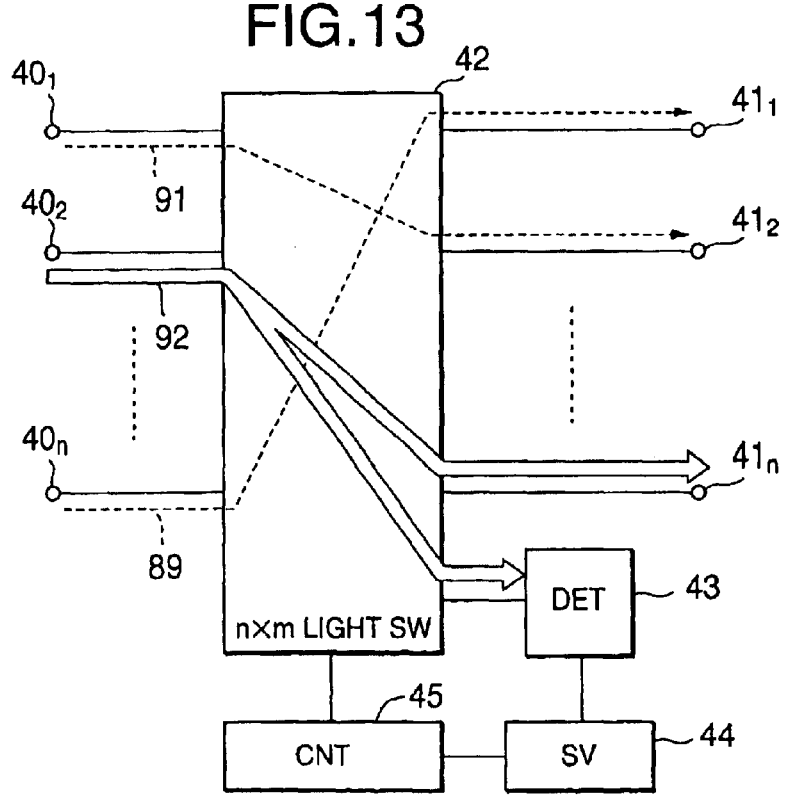

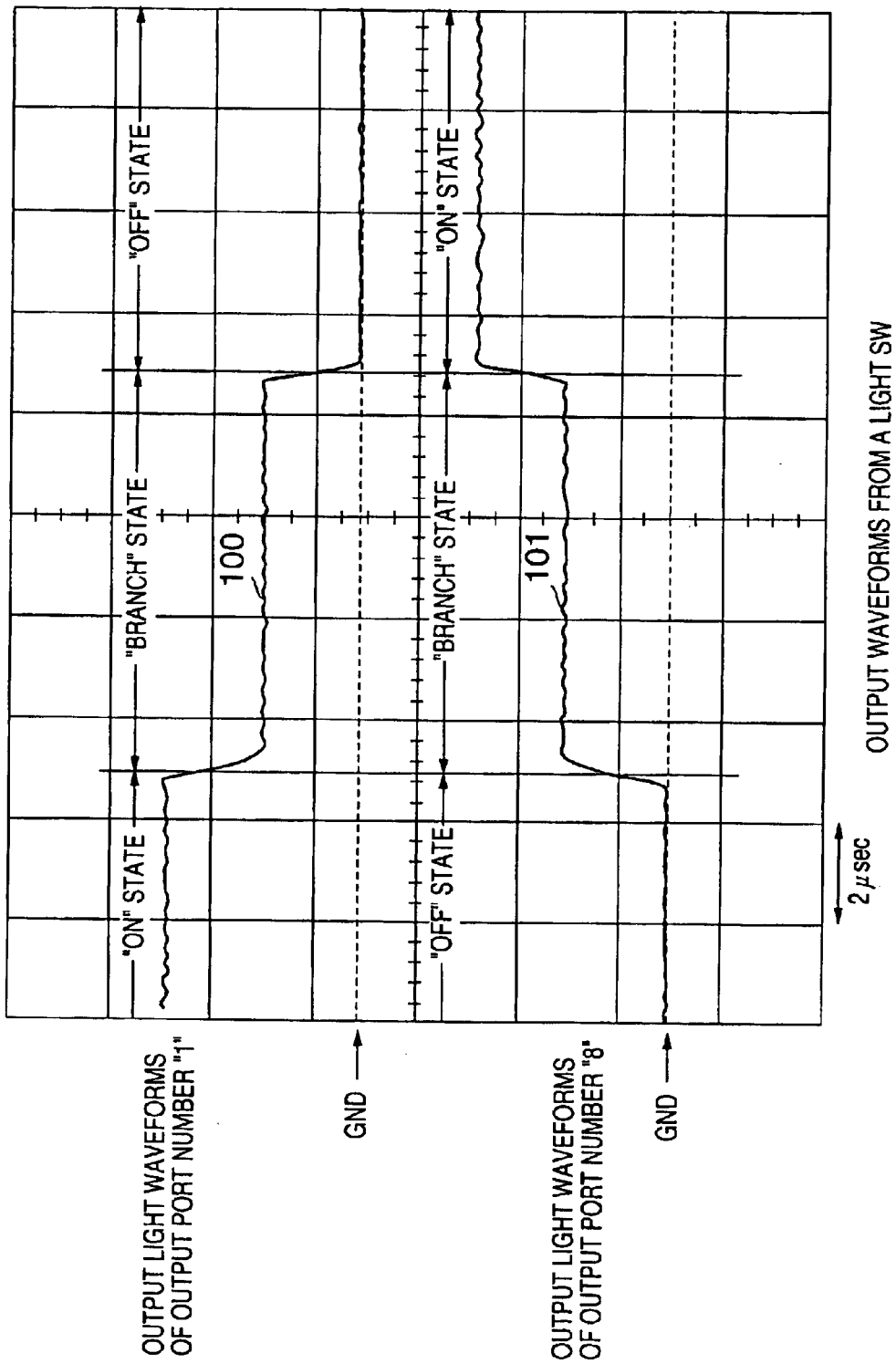

OPTICAL CROSS-CONNECT APPARATUS, AND ITS SIGNAL MONITORING METHOD

BACKGROUND OF THE INVENTION

1. Field of the Invention

The present invention relates to an optical cross-connect apparatus for switching paths of light signals, and in particular, to an optical cross-connect apparatus for supervising quality and management information of light signals of which paths are switched and its signal supervising method.

2. Description of the Prior Art

An optical cross-connect system for switching paths of light signals transmitted into a system is equipped with an optical cross-connect apparatus (hereafter, abbreviated as OXC) having a light switch (Switch: hereafter, abbreviated as SW). It is possible to switch paths of large-capacity light signals by applying to this cross-connect system the wavelength division multiplex (hereafter, abbreviated as WDM) technology for multiplexing a plurality of signals of mutually different wavelength components. Various research and development on OXC equipped with optical SW are underway focusing attention on easiness of setting up a signal path, efficiency of protection and so on toward the information and communication age of increasingly larger-capacity (Chungpen Fan, "Examining an integrated solution to optical transport networking.", Wavelength Division Multiplexing: (The first ever European meeting place for WDM Systems, Network, Marketing & Engineering Professionals), November 1997, London pp. 18–23).

FIG. 32 represents, as a concept, configuration of an optical cross-connect system to which such OXC is applied. An optical cross-connect system is equipped with a plurality of OXC, and is connected by an optical fiber transmission path on which light signals are mutually transmitted. Here, it has OXC $10_1$ to $10_6$, and for instance, OXC $10_1$ is connected with OXC $10_2$ via optical fiber transmission path $11_1$, with OXC $10_5$ via optical fiber transmission path $11_5$, and with OXC $10_6$ via optical fiber transmission path $11_6$ respectively. Also, OXC $10_4$ for instance is connected with OXC $10_3$ via optical fiber transmission path $11_3$ with OXC $10_5$ via optical fiber transmission path $11_4$, with OXC $10_6$ via optical fiber transmission path $11_8$, and OXC $10_6$ is connected with OXC $10_3$ via optical fiber transmission path $10_7$ respectively.

On operating an optical cross-connect system, in order to maintain the system reliability, it is necessary to supervise light signals that are switchable to various paths and manage transmission signals inside the system by each OXC as shown in FIG. 32. For instance, there are many transmission paths for light signals transmitted from point A to point B. Therefore, each OXC supervises paths, quality states and so on of light signals, sets paths of light signals and avoids failure occurrence points. To be more specific, in OXC $10_1$, $10_6$, $10_3$ and $10_4$, a service signal transmitted from point A to point B on path 12 indicated by dashed lines in FIG. 32 supervises transmitted light signals as to their respective quality and management information $13_1$, $13_2$, $13_3$ and $13_4$ if included in them.

FIG. 33 represents an overview of conventional OXC for supervising quality and management information of such light signals. This OXC has light signal input terminals $20_1$ to $20_n$ (n is a natural number of 2 or more) to which light signals are inputted, nxn light SW21 for having light signals inputted from n pieces of input port corresponding to each of these light signal input terminals $20_1$ to $20_n$ outputted from any one of n pieces of output port and switching their paths, light signal detecting section (hereafter, abbreviated as DET) for detecting quality of light signals outputted from n pieces of output port of nxn light SW21 and management information included therein, light signal output terminals $23_1$ to $23_n$ to which light signals outputted from each of n pieces of output port of nxn light SW21 are outputted, light signal supervising section (hereafter, abbreviated as SV) 24 for supervising quality and management information of light signals from the output ports detected by DET $22_1$ to $22_n$ and control section (hereafter, abbreviated as CNT) 25 for controlling path switching of nxn light SW21 from supervising results of SV24.

nxn light SW21 arbitrarily connects n pieces of input port with n pieces of output port according to a control signal from CNT25. DET$22_1$ to $22_n$ output light signals outputted from each output port of nxn light SW21 as-is and detect various signal states by branching a part of them. Such detecting functions of DET are a light signal level detecting function, a signal-to-noise (hereafter, abbreviated as SN) ratio detecting function, a light reproduction and overhead (hereafter, abbreviated as OH) detecting function, and a light reproduction and OH terminating function. As prescribed by the Synchronous Digital Hierarchy (hereafter, abbreviated as SDH) and the Synchronous Optical Network (hereafter, abbreviated as SONET) for instance, this OH has information on frame synchronization, error supervising, maintenance, operation and so on inserted in a predetermined position of light signals composed in a frame of a predetermined format.

In conventional OXC of such configuration, light signals inputted from light signal input terminals $20_1$ to $20_n$ are inputted in n pieces of input port of nxn light SW21 respectively, and as a result of path switching performed according to a control signal from CNT25, they are outputted from any one of n pieces of output port of nxn light SW21. And the light signals outputted from n pieces of output port of nxn light SW21 have their quality and management information included in them detected at DET$22_1$ to $22_n$ respectively, and are also outputted from light signal output terminals $23_1$ to $23_n$. Such detected information is supervised at SV24, and SV24 instructs CNT25 to change path setting for instance from the results of supervising. CNT25 outputs a control signal responding to this instruction from SV24 to nxn light SW21, and switches the path of light signals inputted from the input ports.

As a technology on OXC for supervising such light signals, in addition to this, the Japanese Patent Laid-Open No. 5-183509 "Light Switch and Optical Channel" for instance discloses a technology to perform path cutting or path setting for a light SW that supervises light signals branched on the one hand by a branching device provided per signal line and switches paths of light signals branched on the other hand by the branching device.

BRIEF SUMMARY OF THE INVENTION

Object of the Invention

However, the conventionally proposed OXC required DET for detecting information to be supervised from light signals for each one of n pieces of output port of a light SW, leading to larger size of OXC. Furthermore, as optical communication will increasingly spread and light signals will be of larger capacity, the number of ports of a light SW is destined to increase, and thus it becomes necessary to install additional DET to meet the increase, further leading to larger size and higher cost of OXC.

Thus, an object of the present invention is to provide OXC that is, even in the case where a light SW becomes large-seized, capable of supervising quality and management information of light signals passing through inside the apparatus with low-cost configuration.

SUMMARY OF THE INVENTION

In the present invention, an optical cross-connect apparatus includes: light switch means having n (n is a natural number of 2 or more) pieces of first port and at least (n+1) pieces of second port, which switches paths of light signals inputted from each of said first ports and has them outputted from any one of said second ports; light path control means for branching a path of said light switch means so as to have light signals inputted from any one of said first ports outputted from any two of said second ports; and light signal supervising means for supervising quality of light signals outputted from either of said two ports.

To be more specific, it includes light switch means having n pieces of first port and at least (n+1) pieces of second port, and by light path control means, it branches a path so as to have light signals inputted from any one of said first ports outputted from any two of said second ports. And by light signal supervising means, it supervises quality of light signals outputted from either of said two ports.

In the present invention, an optical cross-connect apparatus includes light switch means having n (n is a natural number of 2 or more) pieces of first port and at least (n+1) pieces of second port, which switches paths of light signals inputted from each of said first ports and has them outputted from any one of said second ports, light path control means for branching a path of said light switch means so as to have light signals inputted from any one of said first ports outputted from any two of said second ports, light amplifying means for amplifying light signals outputted from either of said two ports, and light signal supervising means for supervising quality of light signals amplified by this light amplifying means.

To be more specific, the optical cross-connect apparatus includes light amplifying means for amplifying light signals outputted from the light switch means at a previous stage to the light signal supervising means. This can change a branching ratio between light signals to be supervised inputted in the light signal supervising means and signals outputted from the other second ports so that even if the levels of signals to be supervised become lower, the levels of light signals to be originally transmitted become correspondingly higher, and thus it allows an optical cross-connect apparatus of high reliability with a supervising function to be provided.

In the present invention, an optical cross-connect apparatus includes light switch means having a plurality of first and second ports, which switches paths of light signals inputted from each of said first ports and has them outputted from any one of said second ports, light path control means for branching a path of said light switch so as to have light signals inputted from any one of said first ports outputted from any two of said second ports when supervising said light signals and have light signals inputted from each of said first ports outputted from predetermined one of said second ports when not supervising said light signal, and light signal supervising means for supervising quality of light signals outputted from either of said two ports only when performing said supervising.

To be more specific, the present invention provides light switch means having a plurality of first and second ports, and by light path control means, it has light signals inputted from any one of the first ports outputted from any two of the second ports when supervising light signal, and on the other hand, it has light signals inputted from each of the first ports outputted from predetermined one of the second ports when not supervising said light signal. And it supervises, by light signal supervising means, quality of light signals outputted from either of said two ports only when performing supervising.

In the present invention, an optical cross-connect apparatus includes a wavelength separating means for separating, per wavelength component, wavelength multiple light wherein light signals of a plurality of mutually different wavelength components are multiplexed, light switch means having n (n is a natural number of 2 or more) pieces of first port and at least (n+1) pieces of second port, which switches light signals of the respective wavelength components separated by said wavelength separating means inputted from each of said first ports and has them outputted from any one of said second ports, light path control means for branching a path of said light switch means so as to have light signals inputted from one of said first ports outputted from any two of said second ports, light signal supervising means for supervising quality of light signals outputted from a predetermined third port of said two ports, wavelength component converting means for converting each individual light signal outputted from said second ports excluding said third port into a light signal of predetermined wavelength components, and wavelength multiplexing means for multiplexing per predetermined number these light signals converted by the wavelength component converting means.

To be more specific, the present invention provides an input stage of light switch means for an optical cross-connect apparatus with wavelength separating means for separating, per wavelength component, wavelength multiple light wherein light signals of a plurality of mutually different wavelength components are multiplexed, and supervises light signals by having a path of the light switch means branched by light path control means, and on the other hand, it provides an output stage of the light switch means with wavelength component converting means for converting each individual light signal outputted from any port other than a supervising port into a light signal of predetermined wavelength components, and it multiplexes a light signal of each of wavelength components per predetermined unit by wavelength multiplexing means to output them.

Moreover, in the present invention, an optical cross-connect apparatus is characterized by said light signal supervising means that detects and supervises management information placed in an overhead section of a predetermined frame format.

Moreover, in the present invention, the above optical cross-connect apparatus is characterized by said light path control means that sets a path for having light signals to be supervised inputted from each port outputted from said two ports per port in order.

Furthermore, in the present invention, an optical cross-connect apparatus includes light switch means having a plurality of first and second ports, which switches paths of light signals inputted from each of said first ports and has them outputted from any one of said second ports and also switches paths of light signals inputted from each of said second ports and has them outputted from any one of said first ports, n pieces of upward light signal input and output terminals, n pieces of downward light signal input and output terminals, a first light circulator provided corresponding to each of said first ports for outputting upward light signals inputted from each of the upward light signal input terminals to each corresponding port of said first ports and also outputting downward light signals inputted from each of said ports to said downward light signal output terminal, a second light circulator provided corresponding to each of said second ports for outputting downward light signals inputted from each of the downward light signal input terminals to each corresponding port of said second ports and also outputting upward light signals inputted from each of said ports to said upward light signal output terminal, light path control means for branching a path of said light switch means so as to have light signals inputted from any one of said first ports outputted from any two of said second ports and also have light signals inputted from any one of said second ports outputted from any two of said first ports, a first light signal supervising means for supervising quality of light signals outputted from a predetermined third port of any two of said first ports, and a second light signal supervising means for supervising quality of light signals outputted from a predetermined fourth port of any two of said second ports.

To be more specific, the present invention provides each port of light switch means having a plurality of first and second ports with first and second light circulators, each of which performs two-way path switching of upward and downward light signals. And it has a path of light switch means branched by the light path control means to have upward and downward light signals supervised by direction respectively by the light signal supervising means.

Moreover, in the present invention, an optical cross-connect apparatus is characterized by said first and second light signal supervising means that detect and supervise management information placed in an overhead section of a predetermined frame format.

To be more specific, the present invention detects and supervises management information placed in an overhead section of a predetermined frame format, such as those prescribed by SDH and SONET.

Moreover, in the present invention, the optical cross-connect apparatus is characterized by said light path control means that sets a path for having light signals to be supervised inputted from any first or second port outputted from any two of said second or first ports per port in order.

To be more specific, as the paths of the light switch means are branched per port in order, the optical cross-connect apparatus can supervise light signals inputted from any port with one detecting means and one supervising means for supervising light signals even in the case where the apparatus becomes large-sized with additional ports.

BRIEF DESCRIPTION OF THE DRAWINGS

This above-mentioned and other objects, features and advantages of this invention will become more apparent by reference to the following detailed description of the invention taken in conjunction with the accompanying drawings, wherein:

FIG. 12 is an illustration showing a branch connection state when the OXC in the first embodiment has a first service signal to be supervised;

FIG. 13 is an illustration showing a branch connection state when OXC has a second service signal to be supervised in the first embodiment;

FIG. 14 is an illustration showing an example of a response waveform on switching a branch connection of a 8×8 light SW;

DETAILED DESCRIPTION OF THE PREFERRED EMBODIMENTS

Embodiments

The present invention will be described in detail as to embodiments hereafter.

First Embodiment

Figure 1:
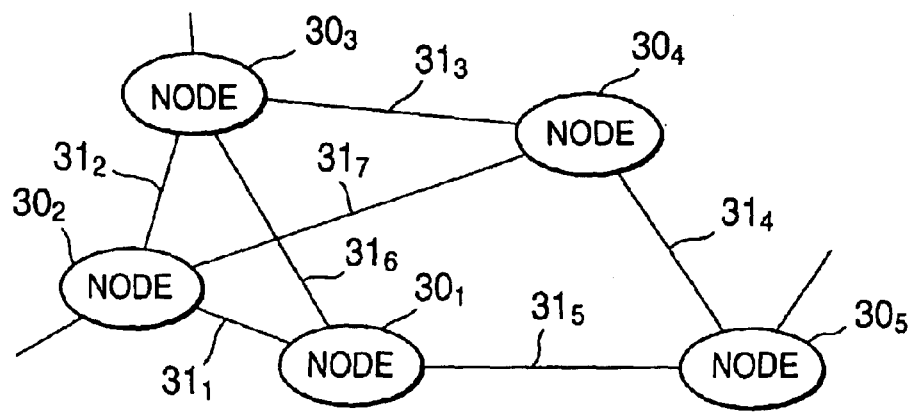
FIG. 1 is a schematic diagram showing an example of configuration of an optical cross-connect system to which an OXC in a first embodiment of the present invention is applied.

FIG. 1 represents in schematic form an example of configuration of the optical cross-connect system to which OXC in the first embodiment of the present invention is applied. This optical cross-connect system is equipped with offices (nodes) having OXC respectively, and is connected by an optical fiber transmission path on which light signals are mutually transmitted. Here, nodes $30_1$ to $30_5$ transmit light signals via fiber transmission paths $31_1$ to $31_7$. For instance, node $30_1$ is connected with node $30_2$ via optical fiber transmission path $31_1$, with node $30_5$ via optical fiber transmission path $31_5$, and with node $30_3$ via optical fiber transmission path $31_6$ respectively. Also, node $30_4$ for instance is connected with node $30_3$ via optical fiber transmission path $31_3$, with node $30_5$ via optical fiber transmission path $31_4$, with node $30_2$ via optical fiber transmission path $31_7$ respectively. Moreover, node $30_2$ for instance is connected with node $30_3$ via optical fiber transmission path $31_2$. In such an optical cross-connect system, paths are switched at each node, and such switched light signals are transmitted between nodes. Thus, it becomes possible, by path setting of a light SW of OXC on each node, to have light signals transmitted in the system arbitrarily transmitted.

Figure 2:
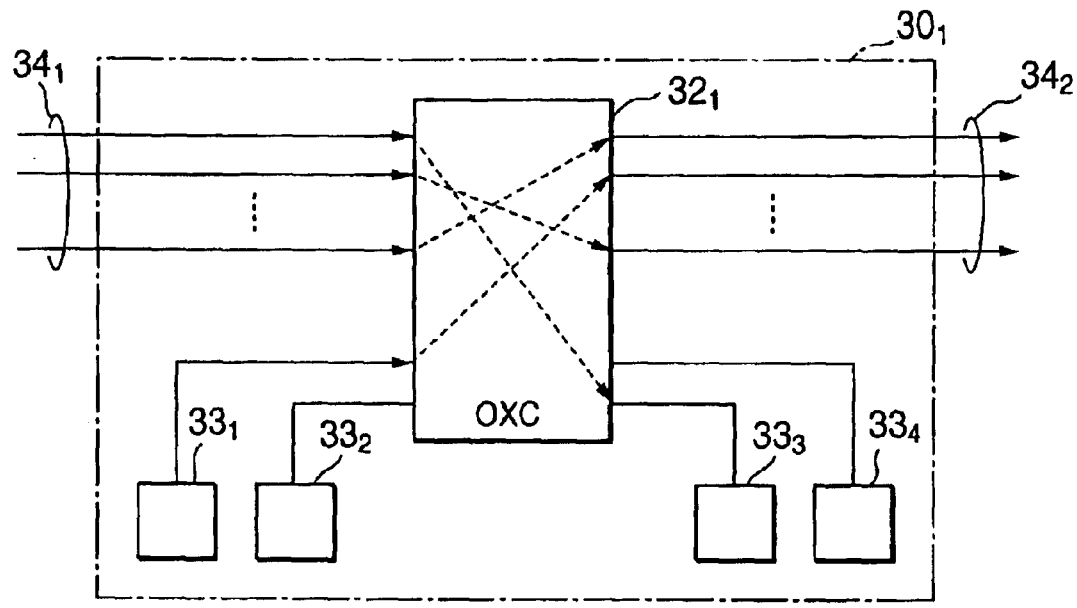
FIG. 2 is a block diagram showing an example of configuration of nodes in the first embodiment.

FIG. 2 represents an example of configuration of the nodes shown in FIG. 1. Here, it only shows configuration of node $30_1$ on the assumption that nodes $30_1$ to $30_5$ have the same configuration. Node $30_1$ has OXC321 in the first embodiment and optical transmitters $33_1$ to $33_4$. The input port of OXC321 is connected with optical fiber transmission path $34_1$ on which light signals from the nodes which are other offices are transmitted and optical transmitters $33_1$ and $33_2$. The output port of OXC321 is connected with optical fiber transmission path $34_2$ on which light signals to be outputted to the nodes which are other offices are transmitted and optical transmitters $33_3$ and $33_4$. For optical fiber transmission paths $34_1$ and $34_2$, there are optical fiber transmission paths $31_1$, $31_6$ and $31_5$ connected with nodes $30_2$, $30_3$ and $30_5$ which are other offices shown in FIG. 1. OXC 321 is equipped with a light SW, and the input port and the output port of OXC 321 are connected according to path setting of this light SW, and it allows quality and management information and so on of light signals passing through inside OXC 321 to be supervised.

Figure 3:
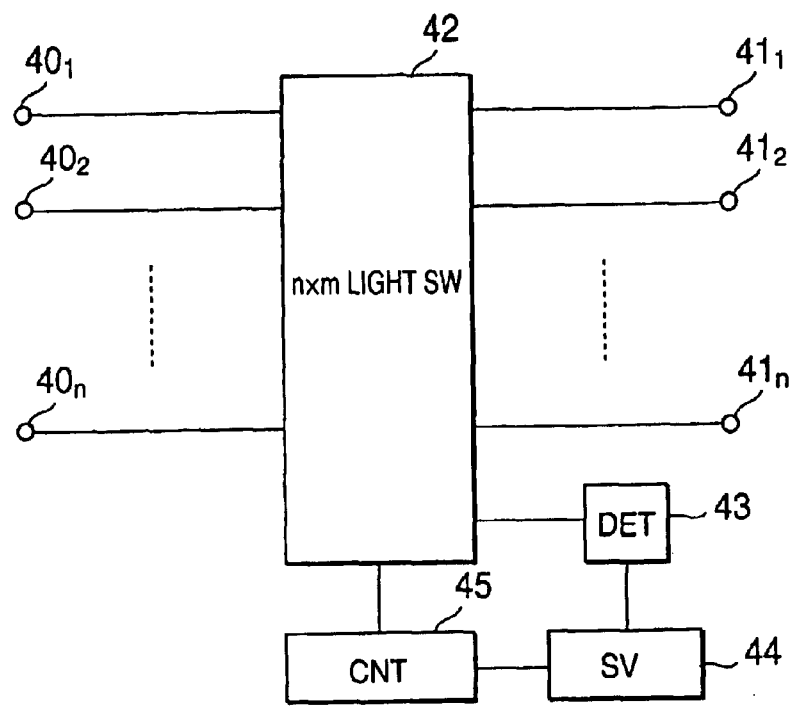
FIG. 3 is a block diagram showing an overview of a configuration of the OXC in the first embodiment.

FIG. 3 represents an overview of configuration of OXC in the first embodiment. The OXC in the first embodiment has n pieces of light signal input terminals $40_1$ to $40_n$, n pieces of light signal output terminals $41_1$ to $41_n$, and n×m light SW 42 (m is a natural number of 2 or more). Here, m is "n+1." n pieces of input port of n×m light SW 42 are connected to light signal input terminals $40_1$ to $40_n$ respectively, and n pieces out of m pieces of output port of n×m light SW 42 are connected to light signal output terminals 411 to $41_n$ respectively.

In addition, this OXC is equipped with light signal detecting section (DET) 43 for detecting quality and management information of light signals outputted from the remaining one piece of output port of n×m light SW42, light signal supervising section (SV) 44 for supervising quality and management information of light signals detected by DET 43, and light path control section (CNT) 45 for generating a control signal for switching a path of n×m light SW42 based on supervising results of SV 44.

n×m light SW42 switches paths of light signals inputted from light signal input terminals $40_1$ to $40_n$ and has them outputted from any of light signal output terminals $41_1$ to $41_n$ according to a control signal from CNT 45. n×m light SW42 can arbitrarily connect n pieces of input port with n pieces of output port according to this control signal, and this path setting allows light signals inputted from light signal input terminals $40_1$ to $40_n$ to be outputted from any of light signal output terminals $41_1$ to $41_n$. In addition, at that time, n×m light SW42 in the first embodiment is characterized by having light signals inputted from any one input port simultaneously outputted from two ports in a connected state called a branch connection and having one of the two output ports outputted to an output port to which DET 43 is connected.

Such n×m light SW42 is comprised of an optical waveguiding path and switch elements formed on a board of which materials are LiNbO$_3$ (lithium [naobate]) or quartz base. As for switch elements, it has 2×2 switch elements of which combination can easily implement 4×4 light SW, 8×8 light SW, and 32×32 light SW.

Figure 4:
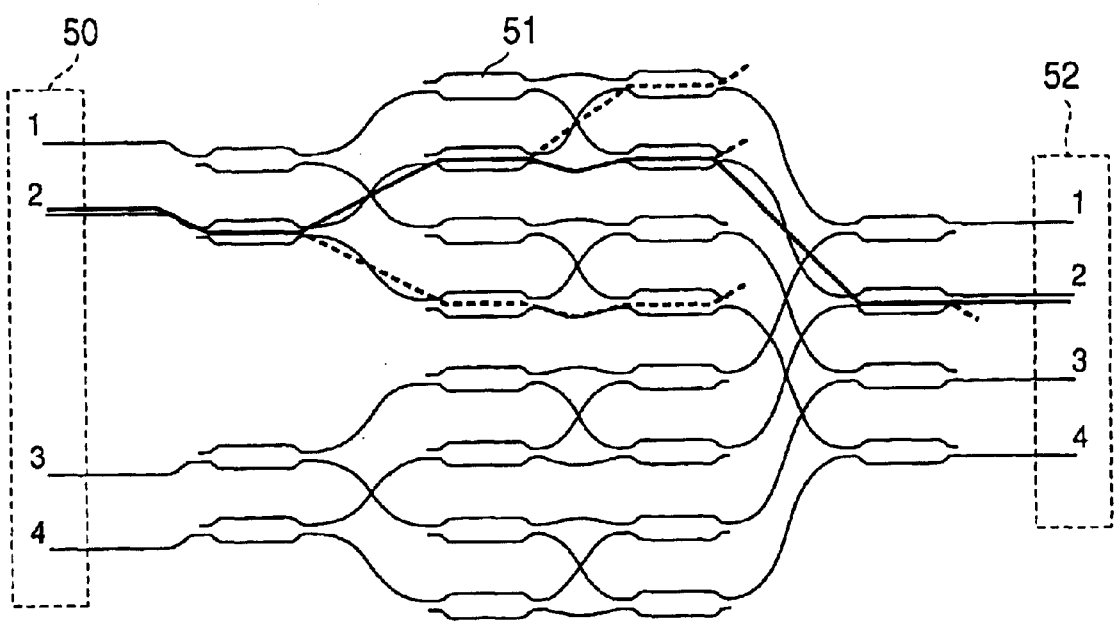
FIG. 4 is an illustration showing an example of a configuration of a 4×4 light SW in the first embodiment.

FIG. 4 represents an example of configuration of 4×4 light SW implemented by LiNbO$_3$. The 4×4 light SW has light signals inputted from input port section 50 having four input ports outputted from any of the four output ports of output port section 52 by combination of 2×2 light SW 51. Each 2 ×2 light SW can switch paths by a control signal, and has light signals outputted from an arbitrary output port by combination of this path switching.

Figure 5:
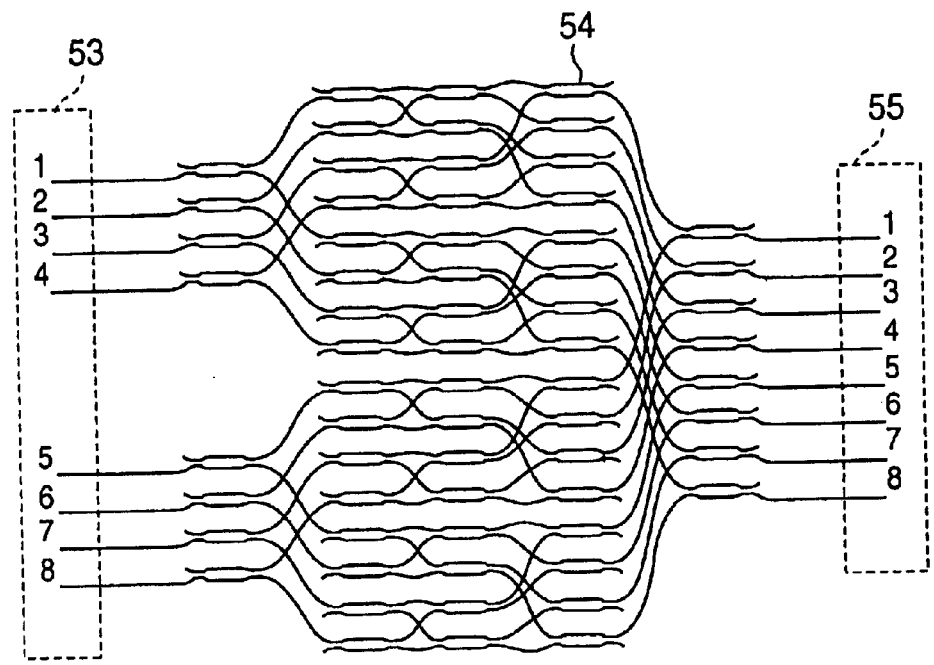
FIG. 5 is an illustration showing an example of a configuration of a 8×8 light SW in the first embodiment.

FIG. 5 represents an example of configuration of 8×8 light SW implemented by LiNbO$_3$. The 8×8 light SW has light signals inputted from input port section 53 having eight input ports outputted from any of the eight output ports of output port section 55 by combination of 2×2 light SW 54. Each 2 ×2 light SW can switch paths by a control signal, and has light signals outputted from an arbitrary output port by combination of this path switching.

Figure 6:
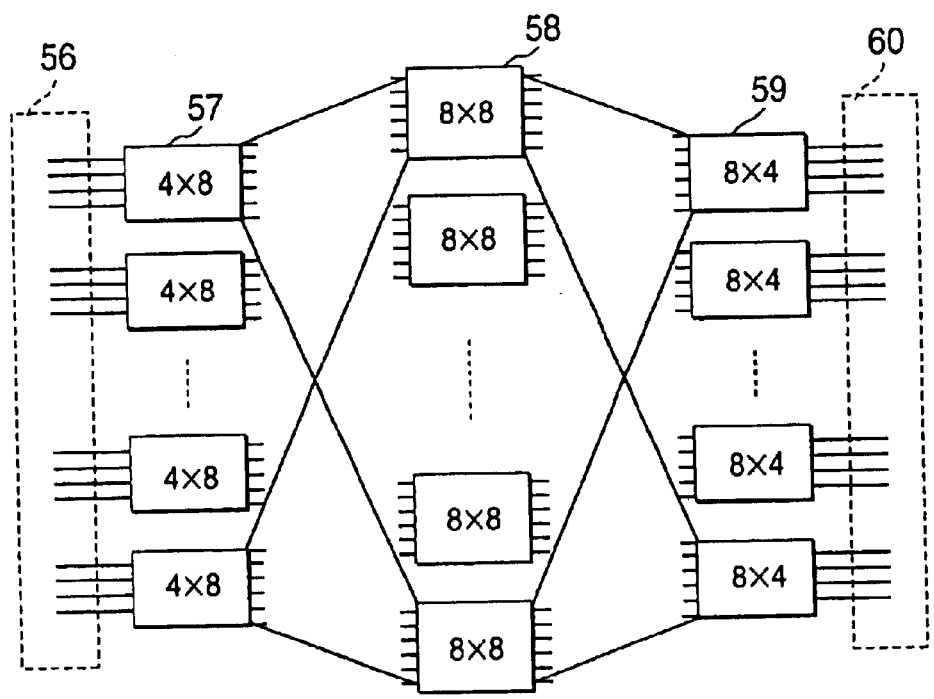
FIG. 6 is an illustration showing an example of a configuration of a 32×32 light SW in the first embodiment.

FIG. 6 represents an example of configuration of 32×32 light SW implemented by LiNbO$_3$. The 32×32 light SW has light signals inputted from input port section 56 having thirty-two input ports inputted to a 4×8 light SW group in which eight pieces of 4×8 light SW 57 configured likewise by combination of 2×2 light SW are arranged. These outputs are inputted to a 8×8 light SW group in which eight pieces of 8×8 light SW 58 configured as above-mentioned are arranged. In addition, these outputs of the 8×8 light SW group are inputted to a 8×4 light SW group in which eight pieces of 8×4 light SW 59 configured likewise by combination of 2×2 light SW are arranged, and these outputs are outputted from any of the thirty-two pieces of output port of output port section 60. Each light SW can switch paths by a control signal, and has light signals outputted from an arbitrary output port by combination of this path switching.

While n×m light SW42 has one more output port than input ports since it has a port to which DET 43 is connected as a supervising output port, it can be implemented likewise by combining 2×2 switch elements in spite of such configuration.

CNT 25 in the first embodiment switches paths of n×m light SW42 by a control signal, and is capable of having the above-mentioned branch connection performed according to applied voltage value given as this control signal.

Figure 7:
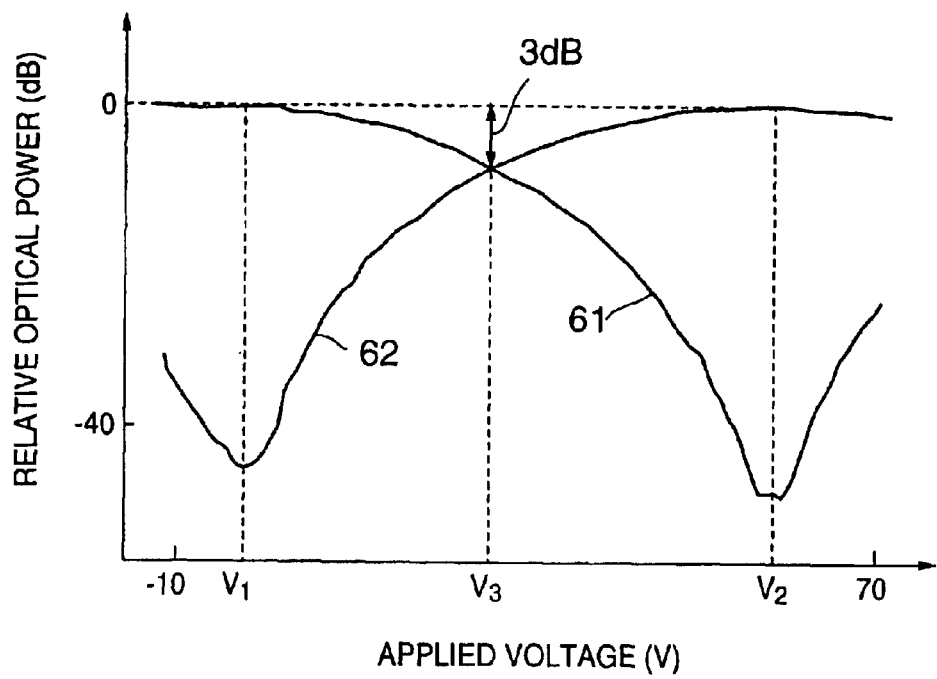
FIG. 7 is an illustration showing an example of switching characteristics of the 8×8 light SW.

FIG. 7 represents an example of switching characteristics of 8×8 light SW. Here, it shows switching characteristics in the case where the paths of light signals of input port No. "1" in input port section 53 of 8×8 light SW shown in FIG. 5 are set to output port No. "1" to "8" in output port section 55. The horizontal axis shows the applied voltage value from −10 volts (hereafter, abbreviated as V) to 70V applied as a control signal from CNT 45. Also, the vertical axis shows the relative optical power value (unit: dB) of light signal power outputted from output port No. "1" or "8" that is a target switching path with reference to light signal power inputted to input port No. "1."

Relative optical power value 61 outputted from output port No. "1" indicates that the lower the applied voltage is, the higher the outputted optical level becomes and that it is outputted by power equivalent to that of the inputted light signals. In addition, relative optical power value 62 of light signals outputted from output port No. "8" indicates that the higher the applied voltage is, the higher the outputted optical level becomes and that it is outputted by power equivalent to that of the inputted light signals. Thus, if attention is focused on light signals outputted from both output ports, it means that applied voltage $V_1$ at which light signals outputted from output port No. "1" are in an "on" state and light signals outputted from output port No. "8" are in an "off" state, namely the lowest level, is the applied voltage capable of control that is most suitable to path switching from input port No. "1" to output port No. "1." Likewise, it means that applied voltage $V_2$ at which light signals outputted from output port No. "8" are in an "on" state and light signals outputted from output port No. "8" are in an "off" state, namely the lowest level, is the applied voltage $V_2$ capable of control that is most suitable to path switching from input port No. "1" to output port No. "8."

Applied voltage $V_3$ at which relative optical power value 61 outputted from output port No. "1" matches up with relative optical power value 62 outputted from output port No. "8" has light signals mutually attenuated just by 3 dB against light signals inputted from input port No. "1" outputted from output ports No. "1" and "8" respectively. This state, as a branch connection state, is simultaneously outputted from the two output ports.

DET 43 in the first embodiment detects various states of light signals outputted from an output port predetermined as a supervising output port out of n×m light SW42 output ports. Such functions of DET are a light signal level detecting function, an optical SN ratio detecting function and an OH supervising function, for instance.

Figure 8:
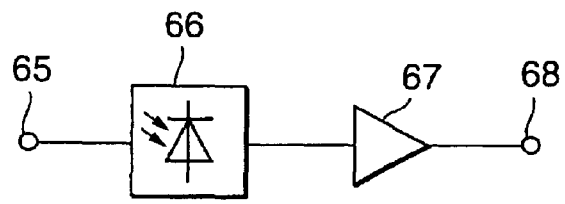
FIG. 8 is a block diagram showing an overview of a configuration of a DET in case of having a light signal level detecting function in the first embodiment.

FIG. 8 represents an overview of configuration of DET in case of having a light signal level detecting function. This DET has light signals inputted from light signal input terminal 65 and inputted to photo diode (hereafter, abbreviated as PD) 66. PD 66 generates a photoelectric current of a size corresponding to a light reception level of the inputted light signals. The photoelectric current generated by PD 66 is supplied to current-voltage conversion circuit 67. Current-voltage conversion circuit 67 generates voltage of a value corresponding to the supplied photoelectric current, and outputs it as an optical level detection value to optical level detection value output terminal 68.

DET of such configuration is used in order to detect an optical level of light signals of which paths were switched by n×m light SW42 in a branch state on PD66 and current-voltage conversion circuit 67 and supervise whether the level of light signals has become a desired level after passing n×m light SW42.

Figure 9:
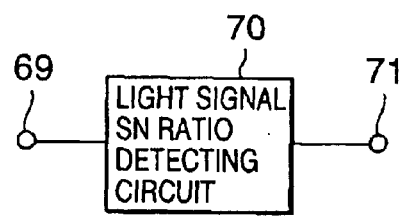
FIG. 9 is a block diagram showing an overview of a configuration of the DET in case of having an optical SN ratio detecting function in the first embodiment.

FIG. 9 represents an overview of configuration of DET in case of having an optical SN ratio detecting function. This DET has light signals inputted from light signal input terminal 69 and inputted to light signal SN ratio detecting circuit 70. Light signal SN ratio detecting circuit 70 detects a light signal SN ratio that is a ratio between a signal level and a noise level of inputted light signals. A light signal SN ratio detected by light signal SN ratio detecting circuit 70 is outputted as a light signal SN ratio detection value from light signal SN ratio detection value output terminal 71.

DET of such configuration is used in order to detect an SN ratio of light signals of which paths were switched by n×m light SW42 in a branch state on light signal SN ratio detecting circuit 70 and supervise quality of light signals after passing n×m light SW42.

Figure 10:
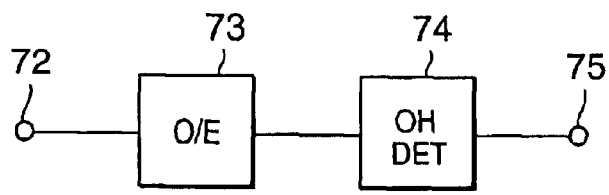
FIG. 10 is a block diagram showing an overview of a configuration of the DET in case of having an OH detecting function in the first embodiment.

FIG. 10 represents an overview of configuration of DET in case of having an OH detecting function. This DET has light signals inputted from light signal input terminal 72 and supplied to optical-electrical conversion circuit (hereafter, abbreviated as O/E) 73. O/E 73 converts inputted light signals to electric signals of values corresponding to the light signal levels, and supplies them to overhead detecting circuit (hereafter, abbreviated as OHDET) 74. OHDET 74 detects OH placed in a predetermined position of a signal configured in a frame of a predetermined format, and outputs it as header information to header information output terminal 75.

DET of such configuration converts the light signals of which paths were switched by n×m light SW42 in a branch connection state to digital electric signals once, and supervises header information, bit errors and so on included therein. For instance, it can detect OH prescribed by SDH, SONET and so on and supervise management information and a quality state of light signals as the entire system.

The functions of DET 43 in the first embodiment are not limited to the light signal level detecting function, light signal SN ratio detecting function and OH supervising function shown in FIGS. 8 to 10. It is also possible for DET 43 to have these functions in advance and adequately select one according to system configuration and a type of light signals to be transmitted.

Figure 11:
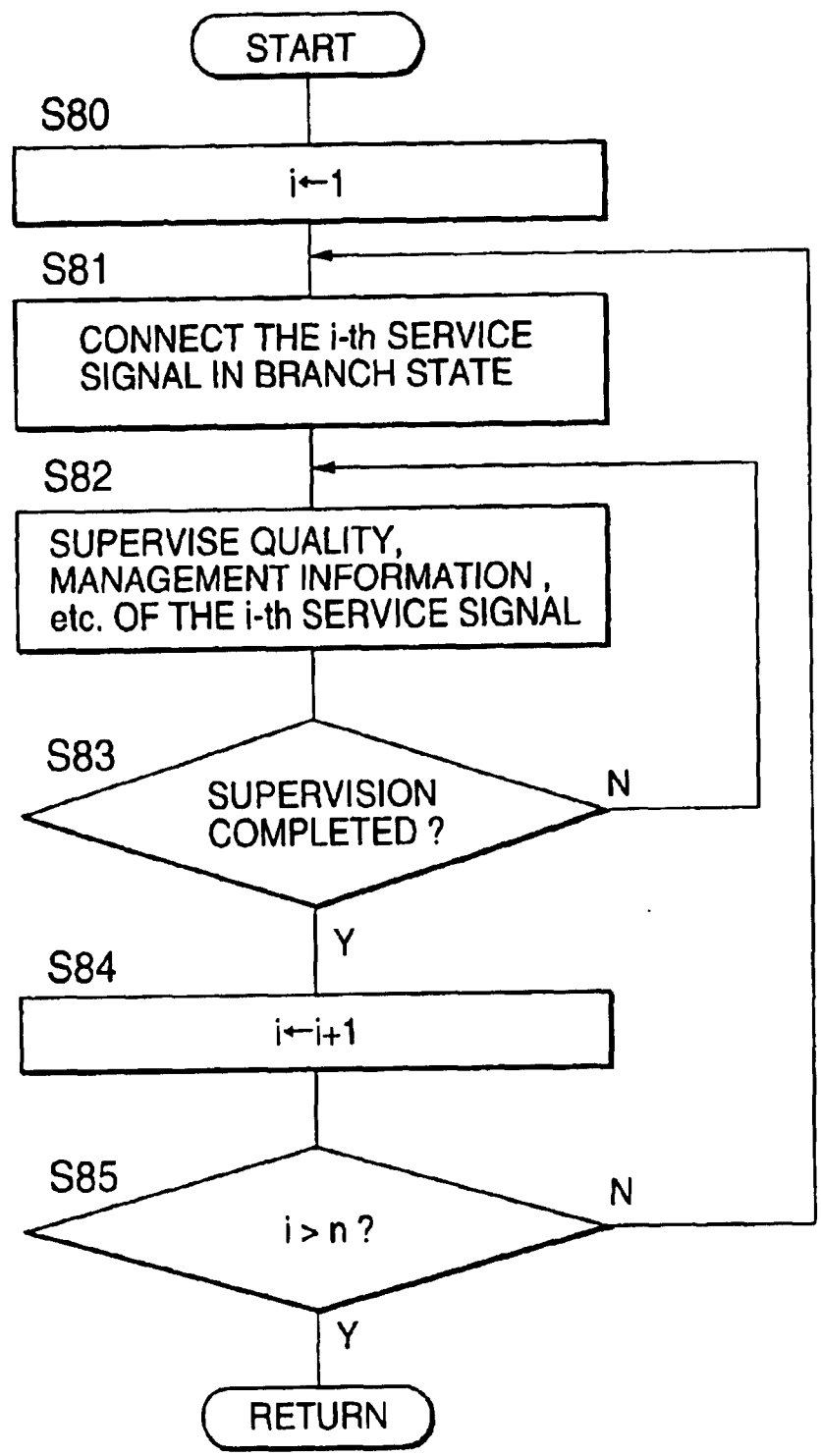
FIG. 11 is a flowchart showing an overview of processing contents of supervising control by CNT in the first embodiment.

CNT 45 is capable of promptly performing failure management for n×m light SW42 such as changing a path of specific light signals on detecting their break and so on from supervising results of SV 44 in compliance with instructions from SV 44 that supervised the above-mentioned detection results by DET 43, and also capable of supervising light signals passing through n×m light SW42. Thus, CNT 45 sequentially performs branch connection to each of light signals to be supervised at n×m light SW42 and has them inputted in DET 43. CNT 45 capable of such control has an unillustrated central processing unit (CPU), and it can perform the above-mentioned control according to a control program stored in a predetermined storage device such as read only memory (ROM) FIG. 11 represents an overview of processing contents of supervising control by CNT 45. CNT 45 first uses variable i indicating an input port number of n×m light SW42 to be supervised, and initializes this variable i to "1" (step S80). To be more specific, as an initial state, it sets as a subject of supervising a first service signal, namely a light signal inputted from input port number "1" of n×m light SW42. Next, CNT 45 provides n×m light SW42 with a control signal equivalent to applied voltage $V_3$ as shown in FIG. 7 so that the i-th service signal, namely a light signal from input port number "i" will be outputted from an output port of an output port number of a predetermined path and an output port of output port number "m" in a state of branch connection (step S81).

And DET43 detects quality and management information of the i-th service signal outputted from output port number "m" and SV44 supervises it (step S82). If supervising does not end (step S83: N), it returns to step S82 and continues supervising. When supervising ends (step S83: Y), it adds "1" to variable i (step S84). It determines whether variable i is larger than n that is the number of output ports excluding output port number "m," namely a port for supervising n×m light SW42 (step S85), and if variable i is equal to or less than n (step S85: N), it performs branch connection to the next service signal again in step S84 (step S81). If variable i is larger than n in step S85 (step S85: Y), it returns to S80 again (return).

Next, operation of OXC in such first embodiment will be concretely described by referring to FIGS. 12 and 13.

FIG. 12 represents, as a concept, a branch connection state when OXC in the first embodiment has the first service signal to be supervised. However, as to the portions that are the same as the OXC shown in FIG. 3, the same symbols are given and description is omitted. Here, it is assumed that path setting is performed in advance so that the first service signal inputted from light signal input terminal $40_1$ corresponding to input port number "1" of n×m light SW42 is outputted from light signal output terminal $41_2$ corresponding to output port number "2" of n×m light SW42. Likewise, it is assumed that path setting is performed in advance so that the second and n-th service signals 88 and 89 inputted from light signal input terminals $40_2$, $40_n$ corresponding to input port numbers "2," "n" of n×m light SW42 are outputted from light signal output terminals $41_n$, $41_1$ corresponding to output port numbers "n," "1" of n×m light SW42.

In the case where the first service signal is to be supervised, path setting is performed for n×m light SW42 by CNT 45 so that first service signal 90 is simultaneously outputted from output port numbers "2," "m" of n×m light SW42 (branch connection state). This branch connection state allows the first service signal to be outputted from light signal output terminal $41_2$, and also allows quality and management information of the first service signal to be detected at DET 43 and supervised at SV 44. Moreover, as the second and n-th service signals are outputted as-is from light signal output terminal of which a path is set, there is no influence on other service signals so that only the supervision subject service signals can be supervised. If supervising of this first service signal is completed, CNT 45 changes paths of n×m light SW42 so as to make the second service signal a subject of supervising next.

FIG. 13 represents, as a concept, a branch connection state when the OXC in the first embodiment has the second service signal to be supervised. However, the same symbols are given and description is omitted as to the portions that are the same as FIG. 12. In the case where the second service signal is to be supervised, n×m light SW42 switches a path of first service signal 91 to predetermined output port number "2" of n×m light SW42, and switches a path of the n-th service signal 89 to predetermined output port number "1" of n×m light SW42.

Path setting is performed so that second service signal 92 is simultaneously outputted from output port numbers "n," "m" of n×m light SW42 (branch connection state). This branch connection state allows the second service signal to be outputted from light signal output terminal $41_n$, and also allows quality and management information of the second service signal to be detected at DET 43 and supervised at SV 44. If supervising of this second service signal is completed, CNT 45 changes paths of n×m light SW42 so that the third service signal becomes a subject of supervising next. Hereafter, it changes paths likewise up to the n-th service signal and repeatedly supervises all the service signals.

In the meantime, as already described, while a branch connection state can be implemented easily to n×m light SW42 in the first embodiment by a control signal equivalent to applied voltage $V_3$ shown in FIG. 7, it is important not to deteriorate a service signal to be supervised so as to allow such supervision. Thus, what influence a branch connection state in a light SW exerts on a service signal to be supervised will be described next.

FIG. 14 represents a response waveform on switching a branch connection of a 8×8 light SW implemented by LiNbO3. Here, a light signal inputted from input port number "1" shows output waveform 100 of a light signal outputted from output port number "1" and output waveform 101 of a light signal outputted from output port number "8" by an 8×8 light SW. If attention is paid to output port number "1," these output wave forms indicate the response wave forms shown when the output light signal changes in the three states of an "on" state, a branch state and an "off" state in order. As also shown in FIG. 7, when an output light signal from output port number "1" is in an "on" state, an output light signal from output port number "8" is in an "off" state. And in a branch state, output light signals are outputted from output port numbers "1," "8." In addition, when an output light signal from output port number "1" is in an "off" state, an output light signal from output port number "8" is in an "on" state.

At the time of changing in the three states as above, the states can be changed without interrupting the output light signals accompanying the path changes.

Also, regarding a code error rate accompanying switching of a branch connection, its characteristics can be measured by the following configuration so as to grasp the extent to which the code error rate deteriorates compared with a case of performing no branch connection state.

Figure 15:
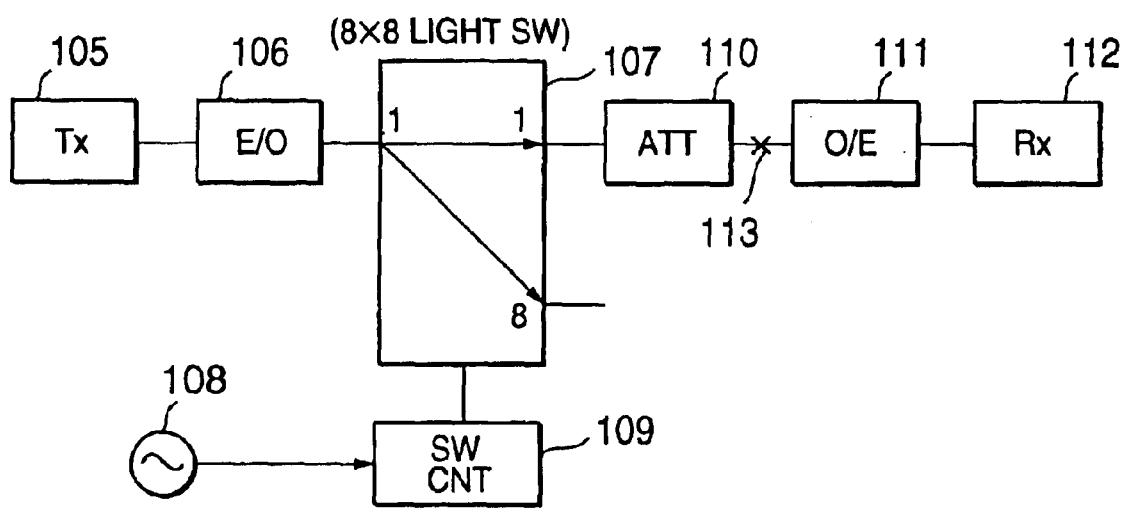
FIG. 15 is a block diagram showing an overview of a system for measuring a code error rate accompanying switching of a branch connection.

FIG. 15 represents an overview of a system for measuring a code error rate accompanying switching of a branch connection. Here, a code error rate of a payload section into which a user signal prescribed by SONET is inserted is measured, as to a measurement light signal ($PN2_{31-1}$) wherein pseudo noise (hereafter, abbreviated as PN) is given per $2_{31-1}$ bit to a light signal having transmission speed of 10 gigabits per second (Gbps) of optical carrier level 192 (hereafter, abbreviated as OC-192) prescribed by SONET. This measurement system has a measurement electric signal transmitted from OC-192 transmitter (Tx) 105 converted into a light signal at E/O106 and inputted in input port number "1" of 8=8 light SW107. 8×8 light SW107 repeats path switching for two states, such as a "branch connection state," output from output port number 1, a "branch connection state," and output from output port number 1, by a control signal outputted from transmitter 108 by switch control section (SWCNT) 109 in a cycle of 10 kilohertz (kHz). The measurement light signal outputted from output port number "1" of 8×8 light SW107 has its output level adjusted by variable attenuator (ATT) 110 and converted into an electric signal by O/E 111 and then received by OC-192 receiver 112. A code error rate is measured as to the measurement light signal of measurement point 113 of O/E 111.

Figure 16:
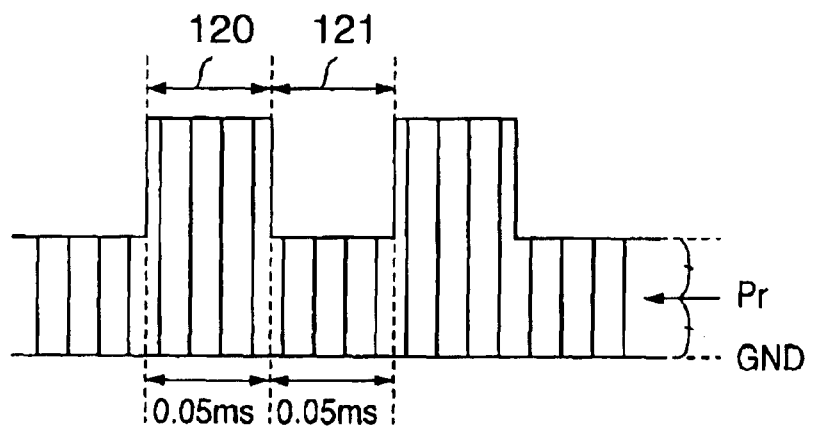
FIG. 16 is an illustration showing an overview of signal power of a measurement light signal measured by a measurement system in FIG. 15.

FIG. 16 represents an overview of signal power of a measurement light signal measured at a measurement point of the measurement system shown in FIG. 15. The measurement light signal at the measurement point of the measurement shown in system FIG. 15 alternately repeats per 0.05 millisecond (ms) normal switching state 120 outputting from output port number "1" and branch connection state 121. In the case of performing a branch connection at applied voltage $V_3$ shown in FIG. 7, light signal power of a measurement light signal in branch connection state 121 is approximately a half of signal power of a measurement light signal in normal switching state 120 as shown in FIG. 16. Here, an average of signal power of a measurement light signal in branch connection state 121 is measured as average light reception power Pr (unit: dBm).

Figure 17:
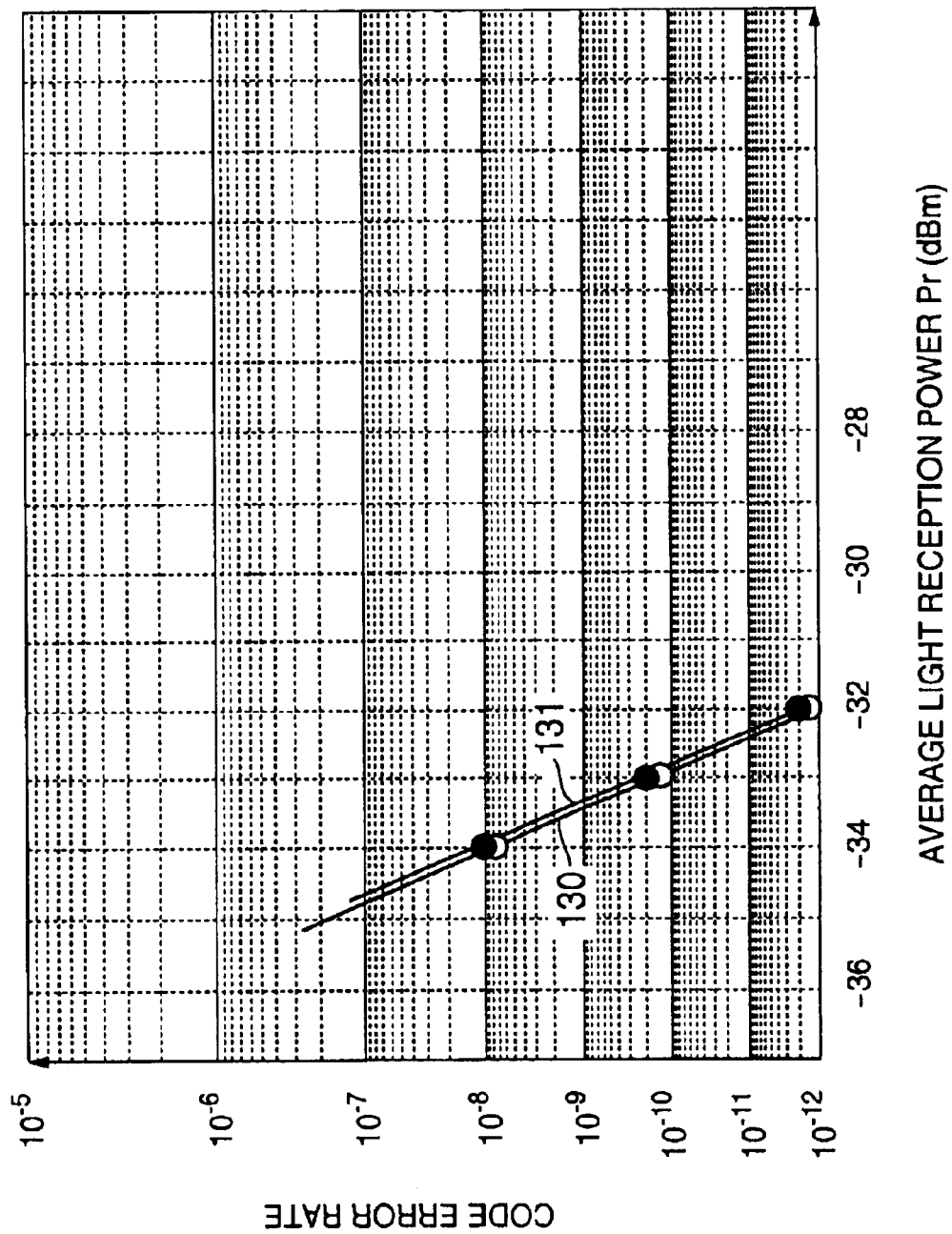
FIG. 17 is an illustration showing an example of code error rate characteristics accompanying branch connection switching in an 8×8 light SW.

FIG. 17 represents an example of code error rate characteristics accompanying branch connection switching in an 8×8 light SW measured by the measurement system shown in FIG. 15. The vertical axis shows a code error rate, and the horizontal axis shows average light reception power Pr (dBm). Also, as shown in FIG. 15, code error rate 130 (measurement point "○") in case of repeatedly switching a branch connection is indicated together with code error rate 131 (measurement point "●") in case of performing no branch connection. Thus, a measurement light signal makes little difference between the case of not switching a light SW and the case of repeatedly switching a path in a branch connection in a light SW. To be more specific, it means that, even in case of repeatedly switching a path in a branch connection in a light SW, quality of a service signal equivalent to a measurement light signal will not deteriorate.

Thus, as explained in FIGS. 14 to 17, it is possible, understandably, to supervise the service signals to be supervised by a branch connection hardly causing deterioration of quality.

The OXC in the first embodiment for supervising light signals by the above-mentioned branch connection can also be applied to a large-capacity transmission network system using WDM technology apart from the optical cross-connect systems of configuration shown in FIGS. 1 and 2.

Figure 18:
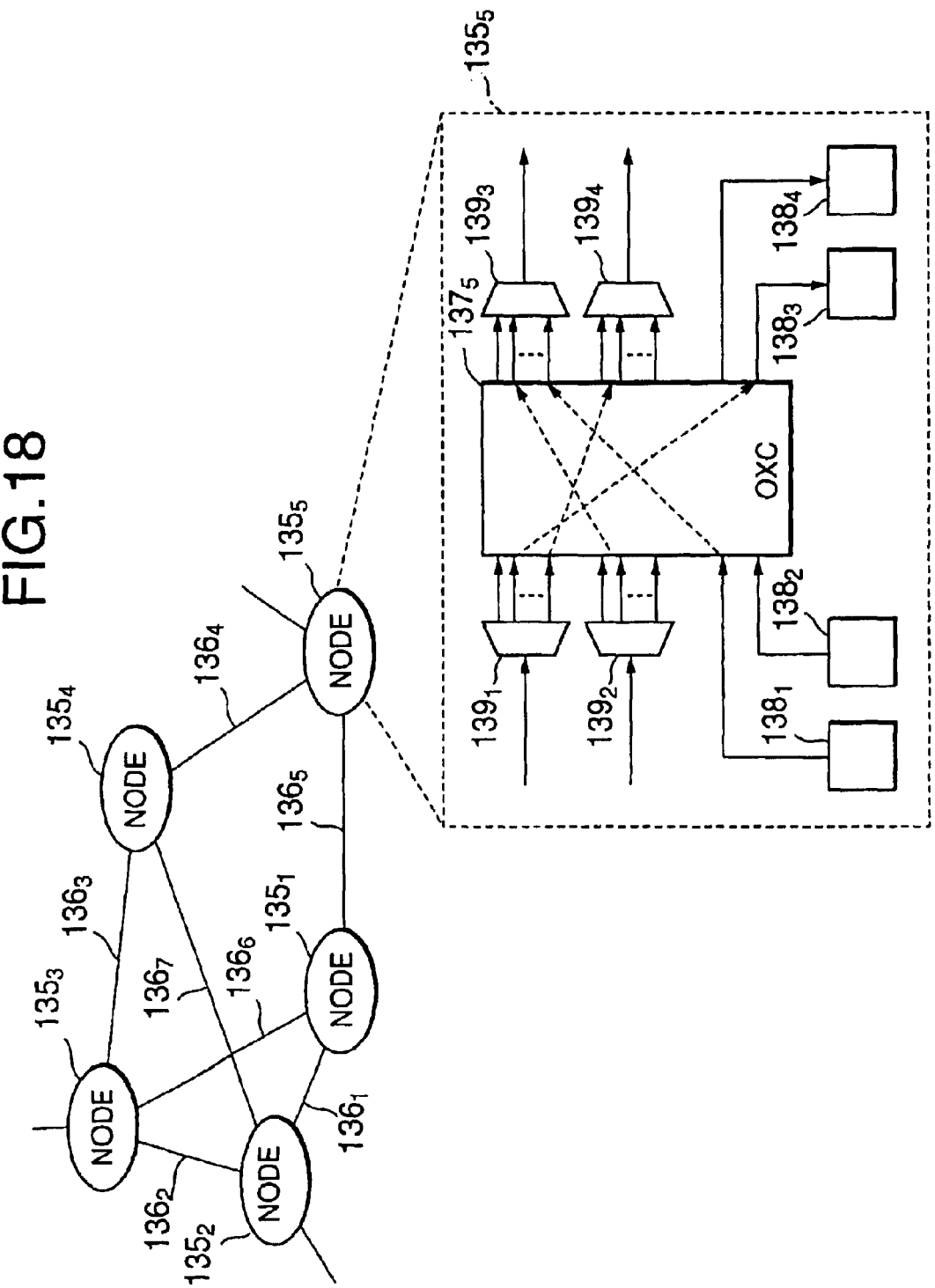
FIG. 18 is an illustration showing an example of a configuration of a transmission network system using WDM technology to which the OXC in the first embodiment is applied.

FIG. 18 represents, as a concept, an example of configuration of a transmission network system using WDM technology to which the OXC in the first embodiment is applied. This network system is equipped with offices (nodes) $135_1$ to $135_5$ having OXC in the first embodiment respectively, and is connected by optical fiber transmission paths $136_1$ to $136_7$ on which light signals are mutually transmitted. On each of optical fiber transmission paths, wavelength multiple light signals having wavelength components $\lambda 1$ to $\lambda w$ (w is a natural number of 2 or more) are transmitted switching their paths at each node. Each node has OXC $137_5$ in the first embodiment, light transmitting apparatuses $138_1$ to $138_4$ and wavelength dividing multiple separators $139_1$ to $139_4$. In wavelength dividing multiple separators $139_1$ and $139_2$, wavelength multiple light signals from each of nodes which are other offices are inputted and are separated into light signals of the wavelength components $\lambda 1$ to $\lambda w$. These separated light signals of the wavelength components and the light signals from light transmitting apparatuses $138_1$ and $138_2$ are supplied to an input port of OXC $137_5$. From the output port of OXC $137_5$, as mentioned above, the light signals to which path switching was performed are inputted to wavelength dividing multiple separators $139_3$ and $139_4$ and light transmitting apparatuses $138_3$ and $138_4$. Wavelength dividing multiple separators $139_3$ and $139_4$ multiplex light signals of the wavelength components $\lambda 1$ to $\lambda w$ and outputs them to the nodes of other offices.

Thus, OXC $137_5$ sets an arbitrary transmission path by performing path setting per wavelength component, and also supervises quality, management information and so on of light signals passing through inside the OXC $137_5$. And WDM is used for connections with other nodes so as to perform large-capacity transmission to an arbitrary node.

As described above, the OXC in the first embodiment performs a branch connection at n×m light SW42 for each of the light signals inputted from n pieces of input port between any one of n pieces of output port and a predetermined supervising port in order following a control signal from CNT 45. And it detects quality and management information from the light signals outputted from the supervising output port at DET43 and supervises it at SV44. As its supervision is performed one by one in a branch state even when there are a plurality of service signals to be supervised passing through the OXC, it requires only one signal detecting means and only one supervising means for the purpose of supervising the service signals, and thus it allows the OXC to be rendered smaller-sized and lower-cost. It is also possible, by performing a branch connection, to supervise not only the service signals not to be supervised but also the service signals to be supervised without influencing the quality.

Second Embodiment

The OXC in the first embodiment was described as one wherein CNT 45 gives applied voltage $V_3$ as shown in FIG. 7 to n×m light SW 42 as a control signal so that light signals inputted from input port number "1" are attenuated by 3 dB respectively and simultaneously outputted from output port numbers "1, " "m. " As opposed to this, the OXC in the second embodiment amplifies light signals outputted from a supervising output port of n×m light SW 42 by an amplifier once, and it thus performs its supervising function to low-level light signals outputted from the supervising output port.

Figure 19:
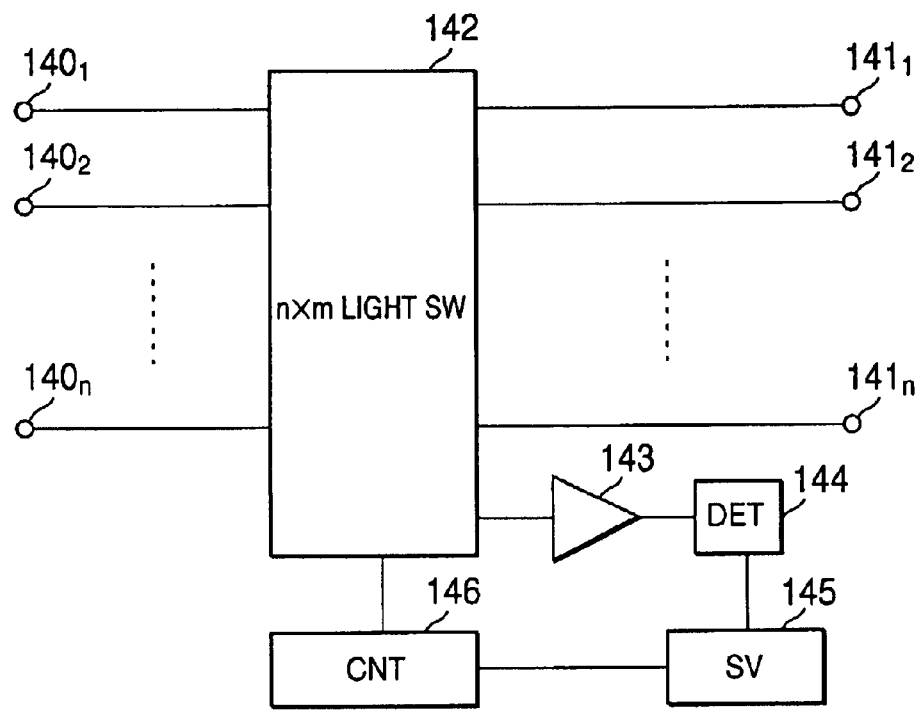
FIG. 19 is a block diagram showing an overview of a configuration of the OXC in a second embodiment.

FIG. 19 represents an overview of configuration of the OXC in such second embodiment. The OXC in the second embodiment has n pieces of light signal input terminal $140_1$ to $140_n$, pieces of light signal output terminal $141_1$ to $141_n$ and n×m light SW142. Here, m is "n+1." n pieces of input ports of n×m light SW142 are connected to light signal input terminal $140_1$ to $140_n$ respectively, and n pieces out of m pieces of output ports of n×m light SW142 are connected to light signal output terminal $141_1$ to $141_n$ respectively. In addition, this OXC has light amplifier 143 for amplifying light signals outputted from the remaining one piece of output port of n×m light SW142, DET 144 for detecting quality and management information of light signals amplified by this light amplifier 143, SV145 for supervising quality and management information of light signals detected by DET 144, and CNT 146 for generating a control signal for switching a path of n×m light SW142 based on supervising results of SV 145.

Description is omitted as to configuration and operation of n×m light SW142, DET 144 and SV 145 in the second embodiment since they are the same as n×m light SW42, DET 43 and SV 44 in the first embodiment.

While the OXC in the second embodiment is the same as the first embodiment as to the processing flow of supervising by CNT 146, the voltage value of applied voltage that is a control signal to be given to n×m light SW142 is different. As for this OXC, when light signals inputted from an input port of n×m light SW142 are put in a branch connection state according to a control signal, the branching ratio of these light signals is set so that the level of service signals outputted to light signal output terminal 141$_1$ to 141$_n$ becomes higher. Along with this, the level of light signals to be supervised outputted from a supervising port becomes lower. Because of this, the OXC in the second embodiment amplifies the light signals outputted from a supervising port of n×m light SW142 by the light amplifier 143, and then detects various states of light signals amplified by DET 144.

A control signal from CNT 146 that allows such a branch connection will be described by taking as an example the switching characteristics of 8×8 light SW shown in FIG. 7.

Figure 20:
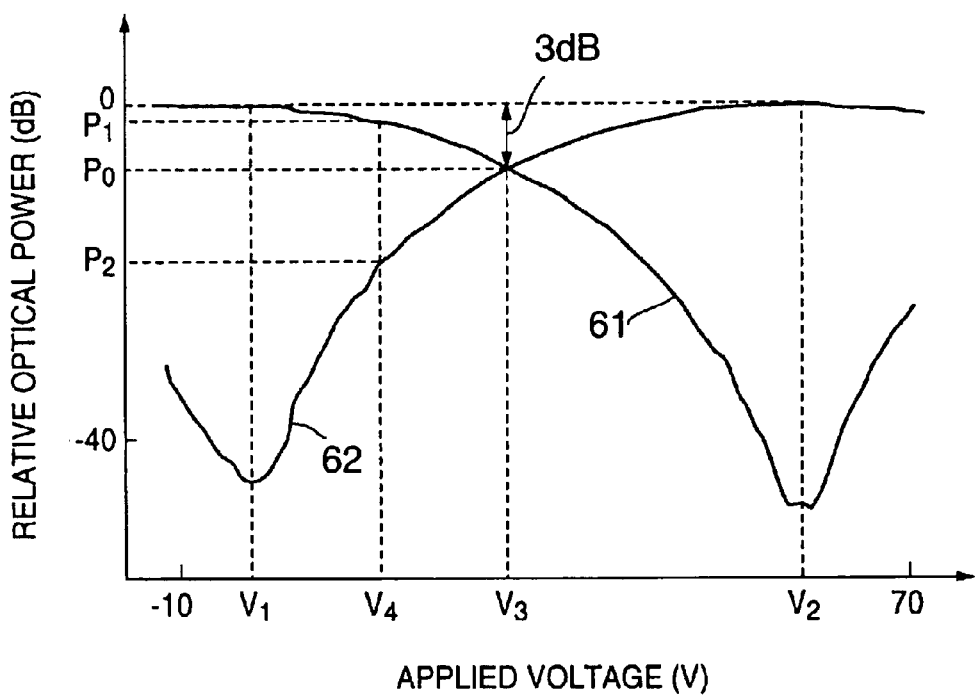
FIG. 20 is an illustration for explaining the concept of branching ratio setting in the second embodiment.

FIG. 20 represents the concept of branching ratio setting in the example of 8×8 light SW switching characteristics shown in FIG. 7. As for the OXC in the first embodiment, as a voltage value equivalent to applied voltage $V_3$ is given to a light SW as a control signal, the levels of light signals outputted from output port numbers "1," "m" are equivalent, and light signals are supervised without deteriorating the characteristics of a code error rate. However, there are cases where precision is required as to this control signal. Thus, as for the OXC in the second embodiment, a voltage value equivalent to applied voltage $V_4$ is given to a light SW as a control signal.

If a voltage value equivalent to applied voltage $V_4$ is given to a light SW, relative optical power value 61 outputted from output port number "1" of an 8×8 light SW, for instance, has higher output level, that is, from $P_0$ to $P_1$ in the first embodiment. On the other hand, relative optical power value 62 outputted from output port number "8" of the 8×8 light SW, for instance, has lower output level, that is, from $P_0$ to $P_2$ in the first embodiment. As for setting a branching ratio of a branch connection, n×m light SW142 can set it at an arbitrary level ratio by deviating it from applied voltage $V_3$. Thus, it is possible to keep the levels of service signals as high as possible while supervising their quality and management information by DET 144, by amplifying light signals to be supervised at a rate of amplification corresponding to the level ratio set here by the light amplifier 143.

Figure 21:
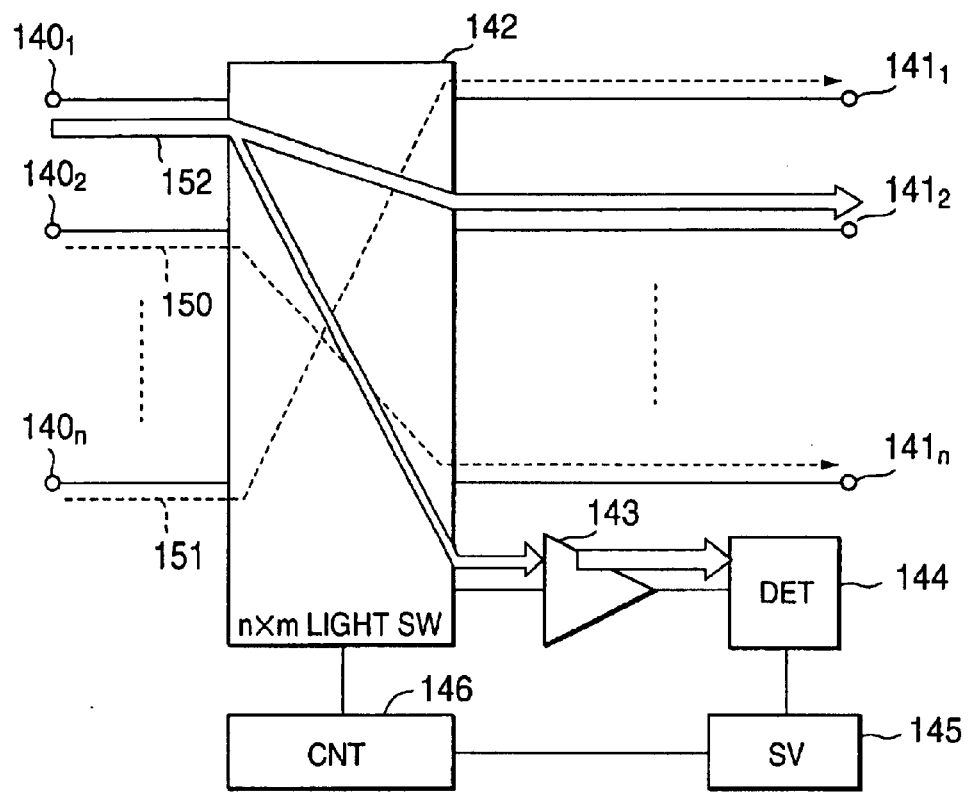
FIG. 21 is an illustration showing a branch connection state when the OXC in the second embodiment has the first service signal to be supervised.

FIG. 21 represents, as a concept, a branch connection state when the OXC in the second embodiment has the first service signal to be supervised. However, as to the portions that are the same as the OXC shown in FIG. 19, the same symbols are given and description is omitted. Here, it is assumed that path setting is performed in advance so that the first service signal inputted from light signal input terminal 140$_1$ corresponding to input port number "1" of n×m light SW142 is outputted from light signal output terminal 141$_2$ corresponding to output port number "2" of n×m light SW142. Likewise, it is assumed that path setting is performed in advance so that the second and n-th service signals 150 and 151 inputted from light signal input terminals 140$_2$, 140$_n$ corresponding to input port numbers "2," "n" of n×m light SW142 are outputted from light signal output terminals 141$_n$, 141$_1$ corresponding to output port numbers "n," "1" of n×m light SW142.

In the case where the first service signal is to be supervised, path setting is performed for n×m light SW142 by CNT 146 so that first service signal 152 is simultaneously outputted from output port numbers "2," "m" of n×m light SW142 (branch connection state). In this branch connection state, it is possible for the first service signal outputted from output port number "2" to be outputted from light signal output terminal 141$_2$, and it is also possible for part of the first service signal outputted from output port number "m" to be amplified by light amplifier 143 to a predetermined level once, and then for its quality and management information to be detected at DET 144 and supervised at SV 145. Moreover, as the second and n-th service signals are outputted as-is from the light signal output terminal of which a path is set, only the service signals to be supervised can be supervised with no influence on other service signals. Here, a branching ratio in a branch connection state is set so that the level of the first signal outputted from output port number "2" is sufficiently higher than the level of a light signal to be supervised as a part of the first signal outputted from output port number "m," and thus it is possible to supervise its quality and so on hardly lowering the level of service signals so as to further improve reliability.

Thus, as for the OXC in the second embodiment, when n×m light SW142 is put in a branch connection state by CNT 146, the branching ratio is set so that the light signals to be supervised will be sufficiently small, and on the other hand, the branched light signals to be supervised will be amplified once by light amplifier 143 and then its quality and management information will be supervised. Thus, it hardly lowers the level of service signals to be originally transmitted, and its function of supervising quality and so on remains intact so that reliability can be further improved.

Third Embodiment

As for the OXC in the first and second embodiments, a supervising output port is assigned to a light SW in order to constantly supervise quality and so on of service signals transmitted in the apparatus. As opposed to this, as for the OXC in the third embodiment, when not supervising service signals, a supervising output port assigned to a light SW accommodates service signals of low priority for instance, just as other output ports do.

Figure 22:
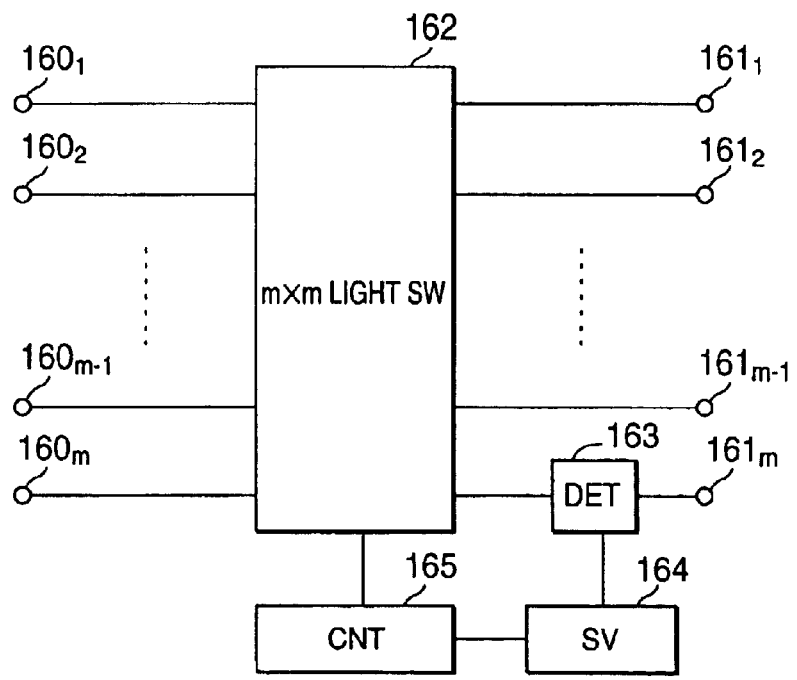
FIG. 22 is a block diagram showing an overview of a configuration of the OXC in a third embodiment.

FIG. 22 represents an overview of configuration of the OXC in the third embodiment. The OXC in the third embodiment has m pieces of light signal input terminal 160$_1$ to 160$_m$, m pieces of light signal output terminal 161$_1$ to 161$_m$ and m×m light SW162. In addition, this OXC has DET 163 for detecting quality and management information of light signals outputted from output port number "m" of m×m light SW162 and having light signals outputted as-is to light signal output terminal 161$_m$ on the other hand, SV 164 for supervising quality and management information of light signals detected by DET 163, and CNT 165 for generating a control signal for switching path setting of m×m light SW162 based on supervising results of SV 164.

While m×m light SW162 has one more input port than n×m light SW42 in the first embodiment, its operation is essentially the same. Also, SV 164 in the third embodiment is the same as SV 44 in the first embodiment. As opposed to this, DET 163 in the third embodiment has a function of detecting a state of light signals and so on outputted from output port number "m" of m×m light SW162 and also a function of outputting light signals as-is. This detecting function of DET 163 includes a light signal level detecting function, optical SN ratio detecting function, a light reproduction and OH detecting function, a light reproduction and OH terminating function for instance. CNT 165 performs the same supervising process as CNT 45 in the first embodiment, and when not performing a supervising process, it has service signals of low priority outputted from output port number "m" of m×m light SW162 outputted as-is to light signal output terminal 161$_m$.

Figure 23:
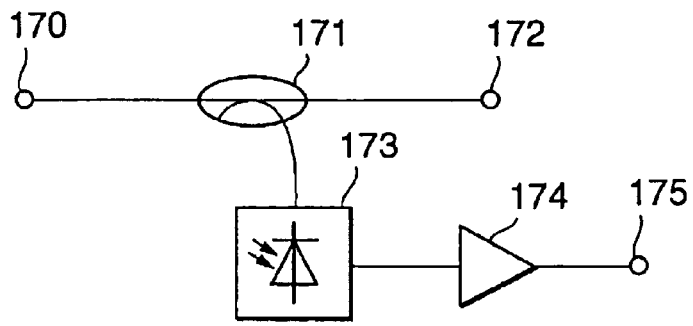
FIG. 23 is a block diagram showing an overview of a configuration of DET in the third embodiment in case of having a light signal level detecting function.

FIG. 23 represents an overview of configuration of DET in the third embodiment in case of having a light signal level detecting function. This DET has light signals inputted from input terminal 170 and branched in two by light coupler 171. One of the two branched by light coupler 171 is outputted as-is from output terminal 172. The other of the two branched by light coupler 171 is inputted to PD 173. PD 173 generates a photoelectric current of a size corresponding to a light reception level of the inputted branch light. The photoelectric current generated by PD 173 is supplied to current-voltage conversion circuit 174. Current-voltage conversion circuit 174 generates voltage of a value corresponding to the supplied photoelectric current, and outputs it as an optical level detection value to optical level detection value output terminal 175.

DET of such configuration is used in order to branch part of light signals of which paths were switched by a light SW, detect the optical level of branched light on PD 173 and current-voltage conversion circuit 174, and supervise whether the level of light signals has become a desired level after passing the light SW.

Figure 24:
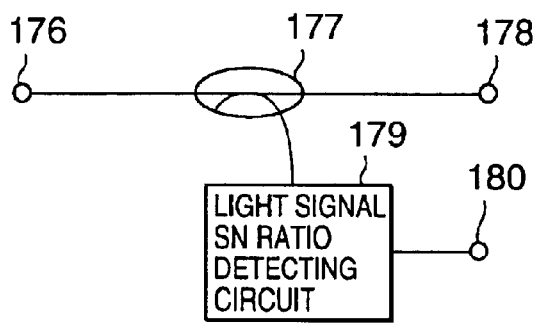
FIG. 24 is a block diagram showing an overview of a configuration of DET in the third embodiment in case of having an optical SN ratio detecting function.

FIG. 24 represents an overview of configuration of DET in the third embodiment in case of having an optical SN ratio detecting function. Such a DET has light signals inputted from input terminal 176 and branched in two by light coupler 177. One of the two branched by light coupler 177 is outputted as-is from output terminal 178. The other of the two branched by light coupler 171 is inputted to light signal SN ratio detecting circuit 179. Light signal SN ratio detecting circuit 179 detects a light signal SN ratio that is a ratio between a signal level and a noise level of inputted branch light. A light signal SN ratio detected by light signal SN ratio detecting circuit 179 is outputted as a light signal SN ratio detection value to light signal SN ratio detection value output terminal 180.

DET of such configuration is used in order to branch part of light signals of which paths were switched by light SW, detect an SN ratio of branch light on light signal SN ratio detecting circuit 179 and supervise quality of light signals after passing the light SW.

Figure 25:
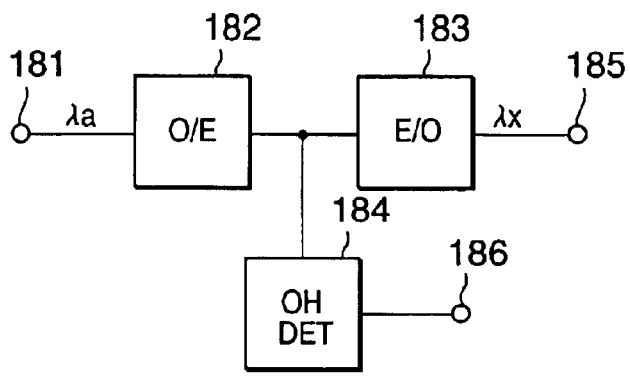
FIG. 25 is a block diagram showing an overview of configuration of DET in the third embodiment in case of having a light reproduction function and an OH detecting function.

FIG. 25 represents an overview of configuration of DET in the third embodiment in case of having a light reproduction function and an OH detecting function. This DET has light signals having wavelength component λa inputted from input terminal 181 and supplied to O/E 182. O/E 182 converts inputted light signals to electric signals of values corresponding to the light signal levels, and supplies them to E/O 183 and OHDET 184. E/O 183 converts them to light signals having wavelength component λx at levels corresponding to the levels of supplied electric signals and outputs them to output terminal 185. OHDET 184 detects OH placed in a predetermined position of a signal configured in a frame of a predetermined format, and outputs it as header information to header information output terminal 186.

DET of such configuration converts the light signals of which paths were switched by a light SW to digital electric signals once, electrically improves their SN ratio and converts them again into light signals to send them out, and also supervises header information, bit errors and so on included in the digital electric signals. For instance, it can detect OH prescribed by SDH, SONET and so on and supervise management information and a quality state of light signals as the entire system. Moreover, from the aspect of its reproducing function, it is used, for instance, as a reproducing apparatus in inter-office long-distance transmission or in case of converting a wavelength component of a light signal from λa to λx between input and output.

Figure 26:
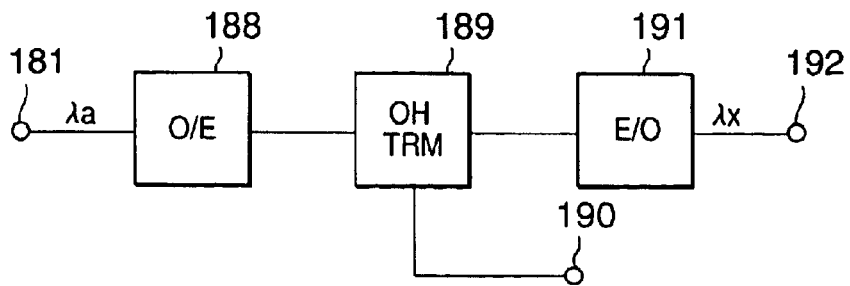
FIG. 26 is a block diagram showing an overview of a configuration of DET in the third embodiment in case of having a light reproduction function and an OH terminating function.

FIG. 26 represents an overview of configuration of DET in the third embodiment in case of having a light reproduction function and an OH terminating function. This DET has light signals having wavelength component λa inputted from input terminal 187 and supplied to O/E 188. O/E 188 converts inputted light signals to electric signals of values corresponding to the light signal levels, and supplies them to OH TeRMinal (hereafter, abbreviated as TRM) 189. OH TRM section 189 detects OH placed in a predetermined position of a signal configured in a frame of a predetermined format, and outputs it as header information to header information output terminal 190 and also reconfigures OH and supplies it to E/O 191 after terminating OH once. E/O 191 converts them into light signals having wavelength component λx at levels corresponding to the levels of supplied electric signals and outputs them to output terminal 192.

DET of such configuration converts light signals of which paths were switched by a light SW to digital electric signals once, electrically improves the SN ratio and then converts them again into light signals to send them out, and also supervises header information, bit errors and so on included in the digital electric signals. For instance, it can detect OH prescribed by SDH, SONET and so on and supervise management information and a quality state of light signals as the entire system. In addition, OH TRM section 189 terminates OH and also reconfigures OH so as to enhance a function of managing the network. Moreover, from the aspect of its reproducing function, it is used, for instance, as a reproducing apparatus in inter-office long-distance transmission or in case of converting a wavelength component of a light signal from λa to λx between input and output.

The functions of DET 163 in the third embodiment are not limited to the light signal level detecting function, light signal SN ratio detecting function, light reproduction and OH detecting function, and light reproduction and OH terminating function shown in FIGS. 23 to 26. It is also possible for DET 163 to have these various functions in advance and adequately select one according to system configuration and a type of light signals to be transmitted.

Figure 27:
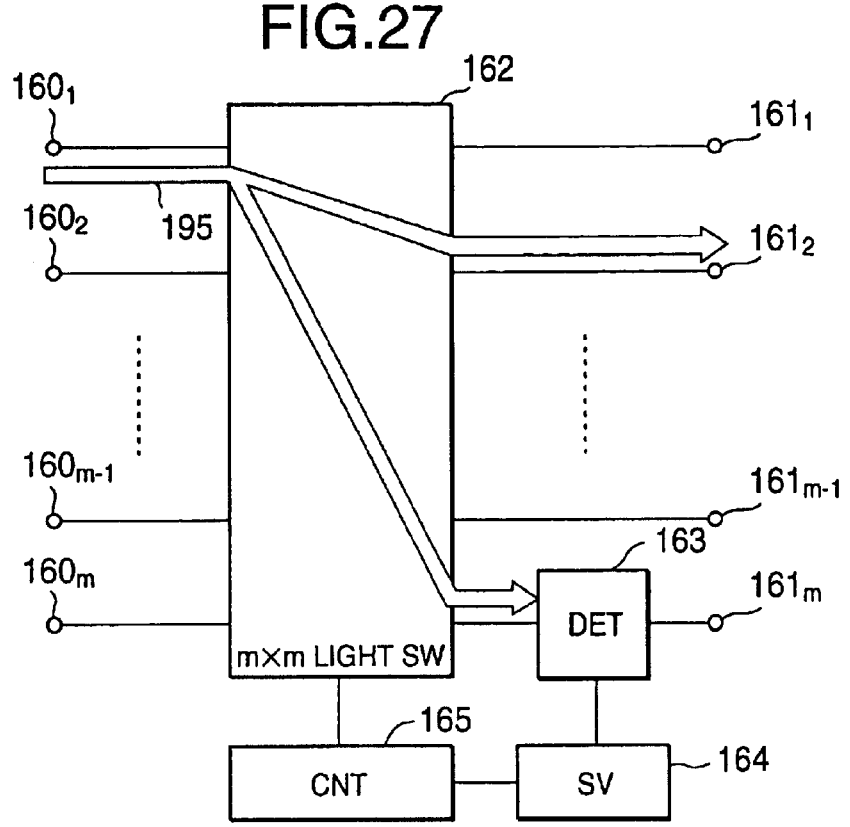
FIG. 27 is an illustration showing a branch connection state when the OXC in the third embodiment has the first service signal to be supervised.
Figure 28:
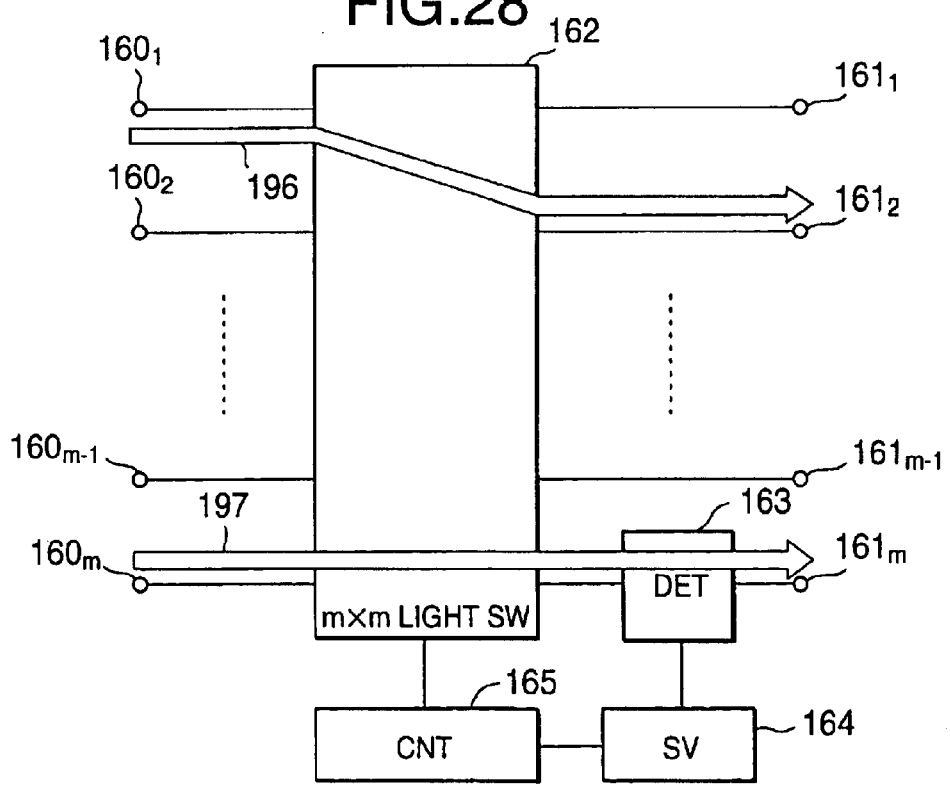
FIG. 28 is an illustration showing a connection state when the OXC in the third embodiment does not perform supervision.

Next, operation of OXC in such third embodiment will be concretely described by referring to FIGS. 27 and 28.

FIG. 27 represents, as a concept, a branch connection state when the OXC in the third embodiment has the first service signal to be supervised. However, as to the portions that are the same as the OXC shown in FIG. 22, the same symbols are given and description is omitted. Here, it is assumed that path setting is performed in advance so that the first service signal inputted from light signal input terminal $160_1$ corresponding to input port number "1" of m×m light SW162 is outputted from light signal output terminal $161_2$ corresponding to output port number "2" of m×m light SW162.

In the case where the first service signal is to be supervised, path setting is performed for m×m light SW162 by CNT 165 so that first service signal 195 is simultaneously outputted from output port numbers "2," "m" of m×m light SW162 (branch connection state). This branch connection state allows the first service signal to be outputted from light signal output terminal $161_2$, and also allows quality and management information of the first service signal to be detected at DET 163 and supervised at SV 164. In the case of continuing supervision, if supervising of the first service signal is completed as with the first embodiment, CNT 165 changes paths of m×m light SW162 so as to make the second service signal a subject of supervising next. However, when such supervising is not performed, CNT 165 of the OXC in the third embodiment can have service signals of low priority inputted from light signal input terminal $160_m$ outputted as-is from light signal output terminal $161_m$.

FIG. 28 represents, as a concept, a connection state when the OXC in the third embodiment does not perform supervision. However, as to the portions that are the same as the OXC shown in FIG. 22, the same symbols are given and description is omitted. To be more specific, path switching is performed in advance so that the first service signal 196 inputted from light signal input terminal $160_1$ corresponding to input port number "1" of m×m light SW162 is outputted from light signal output terminal $161_2$ corresponding to output port number "2" of m×m light SW162, and on the other hand, the m-th service signal 197 of low priority inputted from light signal input terminal $160_m$ corresponding to input port number "m" of m×m light SW162 is outputted from output port number "m" of m×m light SW162 and is outputted as-is from light signal output terminal $161_m$ via DET 163.

Thus, the OXC in the third embodiment has one more input port than the OXC in the first embodiment so as to output as-is from a light signal output terminal when supervising is not performed, so it can accommodates service signals of low priority for instance, and easily improve accommodation effectively using the resources in the apparatus.

Fourth Embodiment

The OXC in the fourth embodiment uses the WDM technology for the OXC in the first embodiment to allow large-capacity light signal transmission to be performed.

Figure 29:
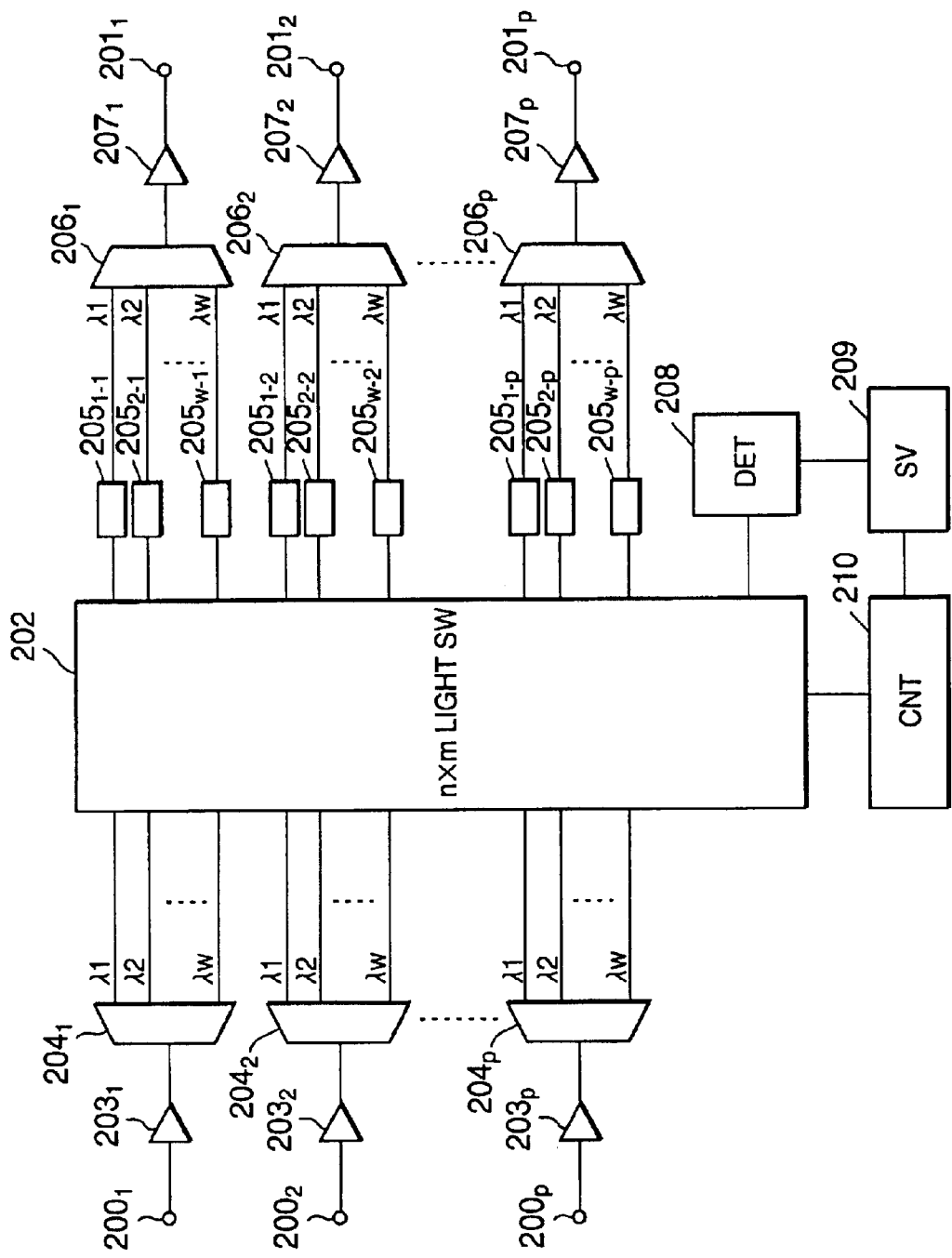
FIG. 29 is a block diagram showing an overview of a configuration of the OXC in the fourth embodiment.

FIG. 29 represents an overview of configuration of the OXC in the fourth embodiment. The OXC in the fourth embodiment has p (p is a natural number of 2 or more) pieces of light signal input terminals $200_1$ to $200_p$ to which light signals having mutually different wavelength components λ1 to λw multiplexed are inputted respectively, ppieces of light signal output terminals $201_1$ to $201_p$ and n×m light SW202. Here, m is "n+1." In addition, it has light amplifiers $203_1$ to $203_p$ and wavelength separators $204_1$ to $204_p$ corresponding to light signal input terminals $200_1$ to $200_p$ respectively. Light amplifiers $203_1$ to $203_p$ amplifies light signals inputted from light signal input terminals $200_{1-1}$ to $200_p$ respectively and supplies them to wavelength separators $204_1$ to $204_p$. Wavelength separators $204_1$ to $204_p$ separates wavelengths per wavelength component λ1, λ2, . . . , λ3 and have them inputted to any of n pieces of input port of n×m light SW202.

Furthermore, the OXC in the fourth embodiment has p sets of wavelength converters $205_{1-1}$ to $205_{w-1}$, $205_{1-2}$ to $205_{w-2}$, . . . and $205_{1-p}$ to $205_{w-p}$ for converting wavelengths of every w pieces of light signal outputted from n pieces out of m pieces of output port of n×m light SW202 into wavelength components λ1 to λw respectively, wavelength multiplexers $206_1$ to $206_p$ for multiplexing light signals having wavelength components λ1 to λw converted by these p sets of wavelength converters, and light amplifiers $207_1$ to $207_p$ for amplifying wavelength multiple light multiplexed by wavelength multiplexers $206_1$ to $206_p$ respectively.

Furthermore, this OXC has DET 208 for detecting quality and management information of light signals outputted from the remaining one piece of output port of n×m light SW202, SV 209 for supervising quality and management information of light signals detected by DET 208, and CNT 210 for generating a control signal for changing path setting of n×m light SW202 based on supervising results of SV 209.

Description is omitted as to configuration and operation of n×m light SW202, DET 208, SV 209 and CNT 210 in the fourth embodiment since they are the same as n×m light SW42, DET 43, SV 44 and CNT 45 in the first embodiment.

As for the OXC in the fourth embodiment of such configuration, light signals with wavelength components λ1 to λw multiplexed transmitted from other offices (nodes) are inputted to light signal input terminals $200_1$ to $200_p$ and optically amplified by light amplifiers $203_1$ to $203_p$. Light signal samplified by light amplifiers $203_1$ to $203_p$ are separated per wavelength component by wavelength separators $204_1$ to $204_p$ respectively and inputted to n pieces of input ports of n×m light SW202. n×m light SW202 can have n pieces of input port and m pieces of output port connected arbitrarily according to a control signal from CNT 210 similarly as n×m light SW42 in the first embodiment. Light signals inputted from light signal input terminals $200_1$ to $200_p$ according to this path setting can be outputted from a desired output port.

Light signals outputted from output port numbers "1" to "m−1" of m pieces of output ports of n×m light SW202 are converted by w pieces into light signals of wavelength components predetermined by p sets of wavelength converters. Wavelength converters $205_{x-1}$ (x is 1 to w) converts them into wavelength components λx. Light signals converted into the wavelength components by wavelength converters $205_{1-1}$ to $205_{w-1}$, $205_{1-2}$ to $205_{w-2}$, . . . , and $205_{1-p}$ to $205_{w-p}$ are multiplexed by w pieces by wavelength multiplexers $206_1$ to $206_p$. Multiplex light multiplexed by wavelength multiplexers $206_1$ to $206_p$ are optically amplified by light amplifiers $207_1$ to $207_p$ and outputted from light signal output terminals $201_1$ to $201_p$ respectively. On that occasion, light signals inputted from any one input port are simultaneously outputted to two output ports in a connected state called a branch connection, where one of them is outputted from an output port to which DET 208 is connected. Light signals inputted from each input port are outputted in order by a branch connection like this from an output port to which DET 208 is connected.

Light signals outputted from output port number "m" of n×m light SW202 have light signal levels, optical SN ratio, OH and so on detected by DET 208 and are supervised by SV 209 as with the OXC in the first embodiment.

Thus, the OXC in the fourth embodiment separates them per wavelength component on the input side of n×m light SW202 by wavelength separators $204_1$ to $204_p$, and has them simultaneously outputted to the predetermined output port and supervising port in a branch connection state at n×m light SW202. Any output port of n×m light SW202 other than the supervising port has wavelength multiplexers $206_1$ to $206_p$ for converting to predetermined wavelength so as to perform wavelength multiplexing here and output them from each light signal output terminal. Thus, it requires only one signal detecting means and only one supervising means for the purpose of supervising each of service signals similarly as the first embodiment, and thus it allows the OXC apparatus to be rendered smaller-sized and lower-cost and also to easily correspond to large-capacity transmission using the WDM technology.

Fifth Embodiment

While the OXC in the first to fourth embodiments supervise only light signals of one direction in which a light SW is transmitted, it is not limited thereto. The OXC in the fifth embodiment accommodates light signals of both directions by using a light circulator.

Figure 30:
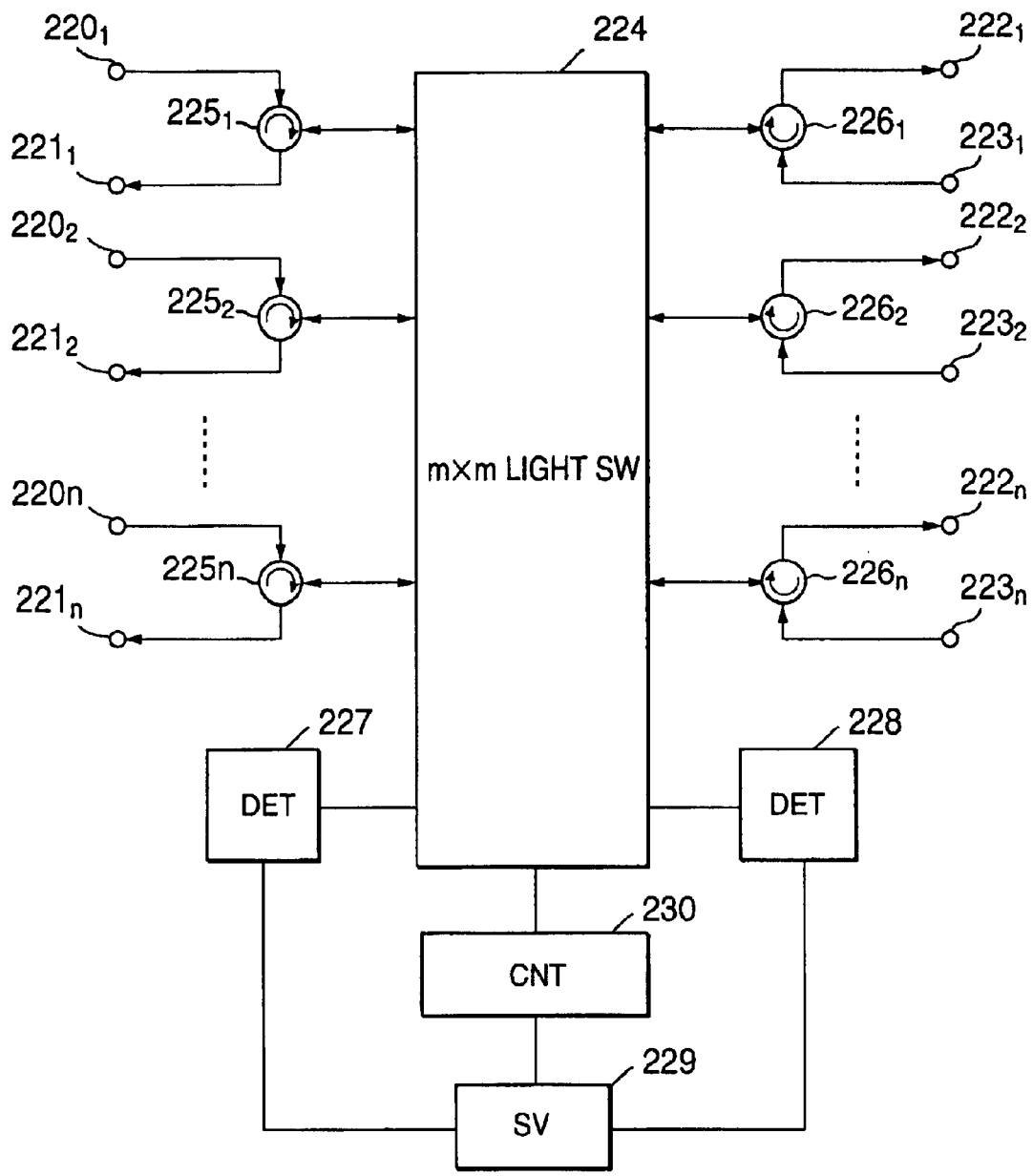
FIG. 30 is a block diagram showing an overview of a configuration of the OXC in the fifth embodiment.

FIG. 30 represents an overview of configuration of the OXC in the fifth embodiment. The OXC in the fifth embodiment has n pieces of upward light signal input terminals $220_1$ to $220_n$, n pieces of downward light signal output terminals $221_1$ to $221_p$, n pieces of upward light signal output terminals $222_1$ to $222_n$, n pieces of downward light signal input terminals $223_1$ to $223_n$ and m×m light SW224. Here, m is "n+1." In addition, the OXC in the fifth embodiment has light circulators $225_1$ to $225_n$ provided corresponding to each of n pieces of input side port out of m pieces of input side port of m×m light SW224 and light circulators $226_1$ to $226_p$ provided corresponding to each of n pieces of output side port out of m pieces of output side port of m×m light SW224. Here, it is assumed that light circulators $225_1$ to $225_n$ are provided corresponding to input side ports numbers "1" to "n" of m×m light SW224, and light circulators $226_1$ to $226_n$ are provided corresponding to output side ports numbers "1" to "n" of m×m light SW224.

Light circulators $225_1$ to $225_n$ are connected to upward light signal input terminals $220_1$ to $220_n$ and downward light signal output terminals $221_1$ to $221_n$ respectively in addition to each input side port of m×m light SW224. Light circulators $225_1$ to $225_n$ output light signals from upward light signal input terminals $220_1$ to $220_n$ to each of input side ports numbers "1" to "n" of m×m light SW224, and output light signals from input side ports numbers "1" to "n" of m×m light SW224 to downward light signal output terminals $221_1$ to $221_n$.

Light circulators $226_1$ to $226_n$ are connected to upward light signal output terminals $222_1$ to $222_n$ and downward light signal input terminals $223_1$ to $223_n$ respectively in addition to each output side port of m×m light SW224. Light circulators $226_1$ to $226_n$ output light signals from output side ports numbers "1" to "n" of m×m light SW224 to upward light signal output terminals $222_1$ to $222_n$, and output light signals from downward light signal input terminals $223_1$ to $223_n$ to output side ports numbers "1" to "n" of m×m light SW224.

In addition, on the remaining one piece each of input side port of input side port number "m" and output side port of output side port number "m" of m×m light SW224, the OXC in the fifth embodiment has DET 227, 228 for detecting quality and management information of light signals outputted from each port, SV 229 for supervising quality and management information of the light signals detected by DET 227, 228, and CNT 230 for generating a control signal for changing path setting of m×m light SW224 based on supervising results of SV 229.

Description is omitted as to configuration and operation of m×m light SW224 since its configuration and operation are essentially the same as m×m light SW162 in the third embodiment although two-way light signals are transmitted. Description is omitted as to configuration and operation of DET 227, 228 and Sv 229 since they are the same as DET 43 and SV 44 in the first embodiment.

Figure 31:
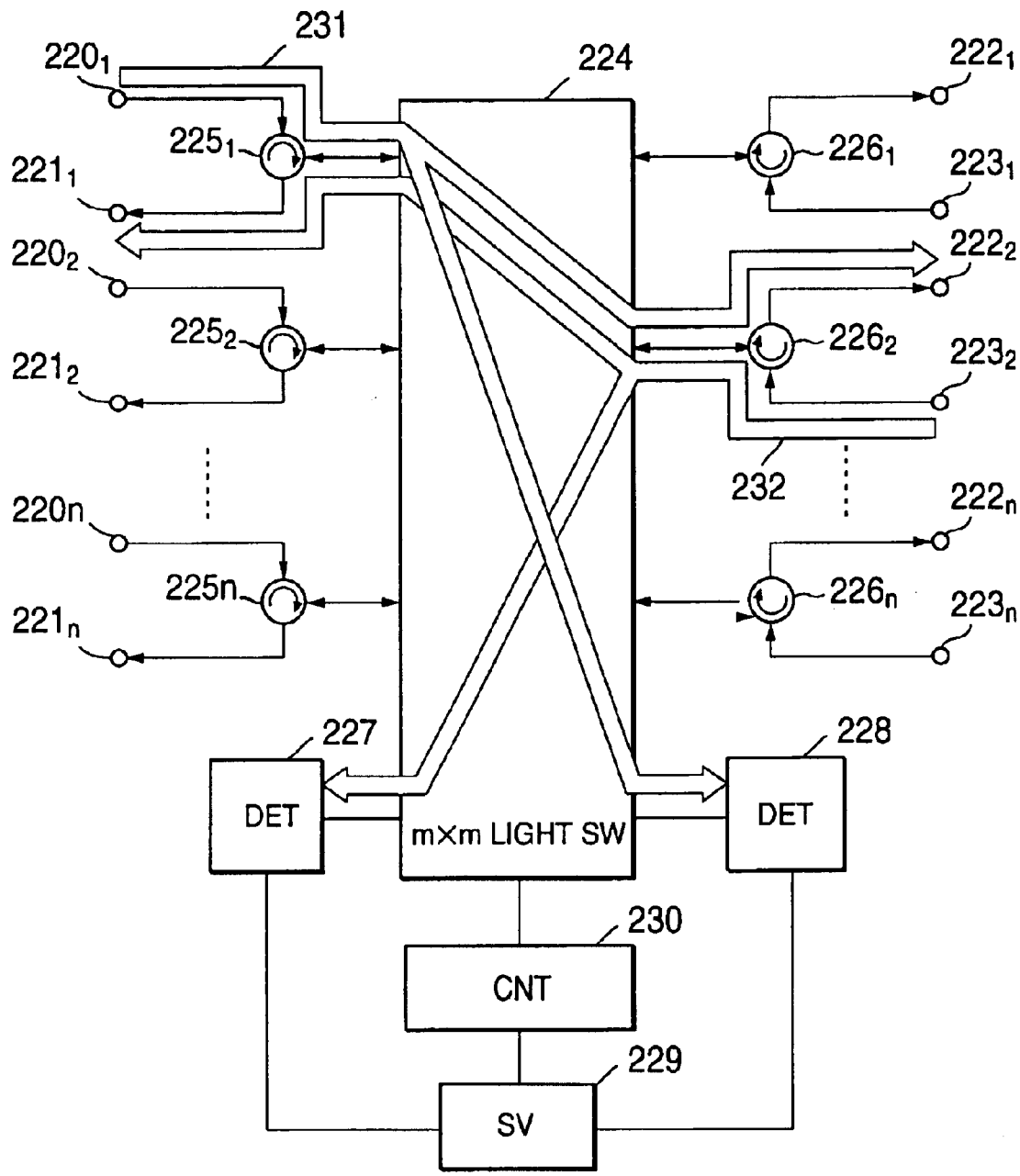
FIG. 31 is an illustration showing a branch connection state in the OXC in the fifth embodiment.
Figure 32:
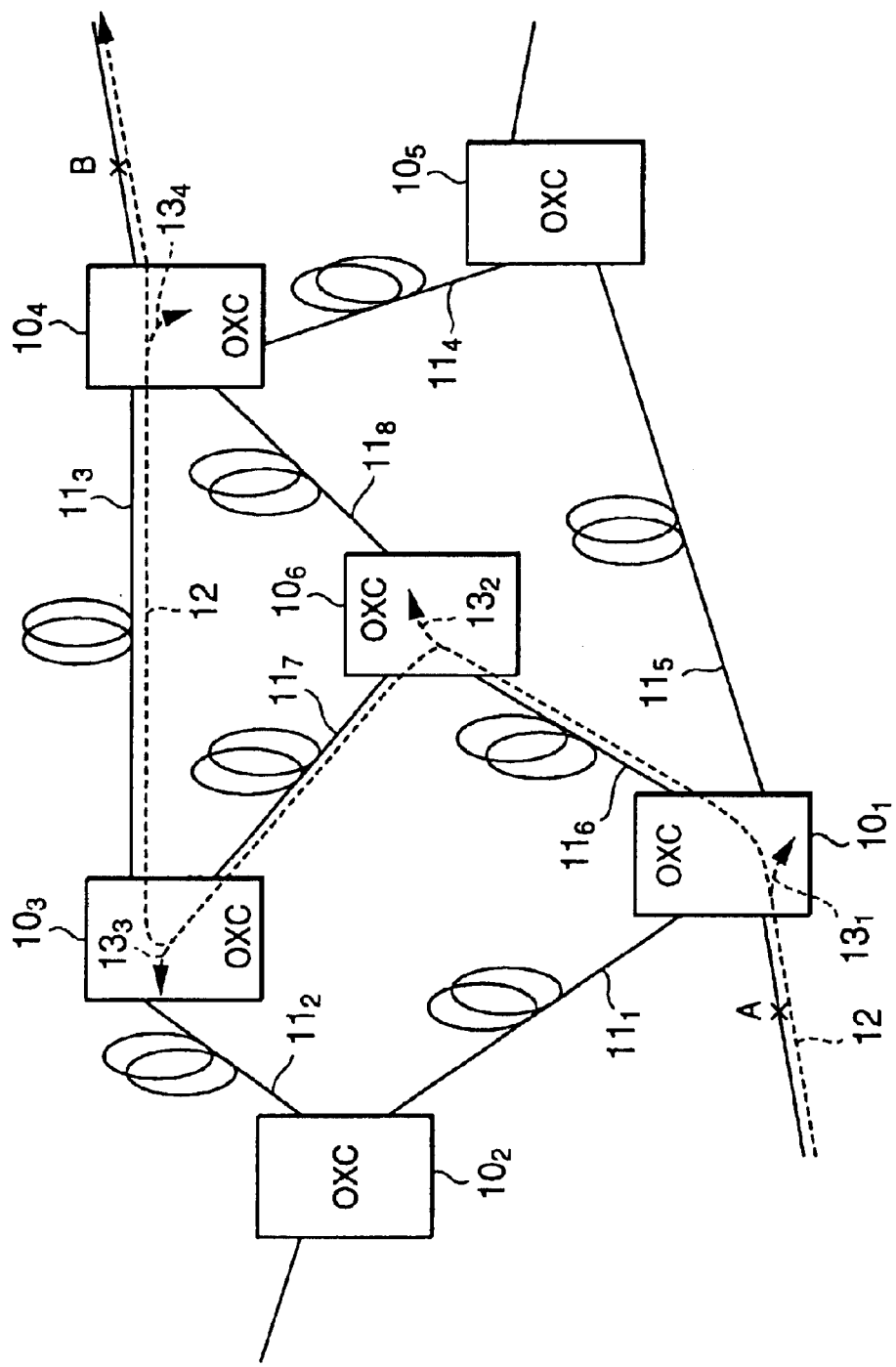
FIG. 32 is a conceptual illustration showing a configuration of an optical cross-connect system to which such OXC is applied.
Figure 33:
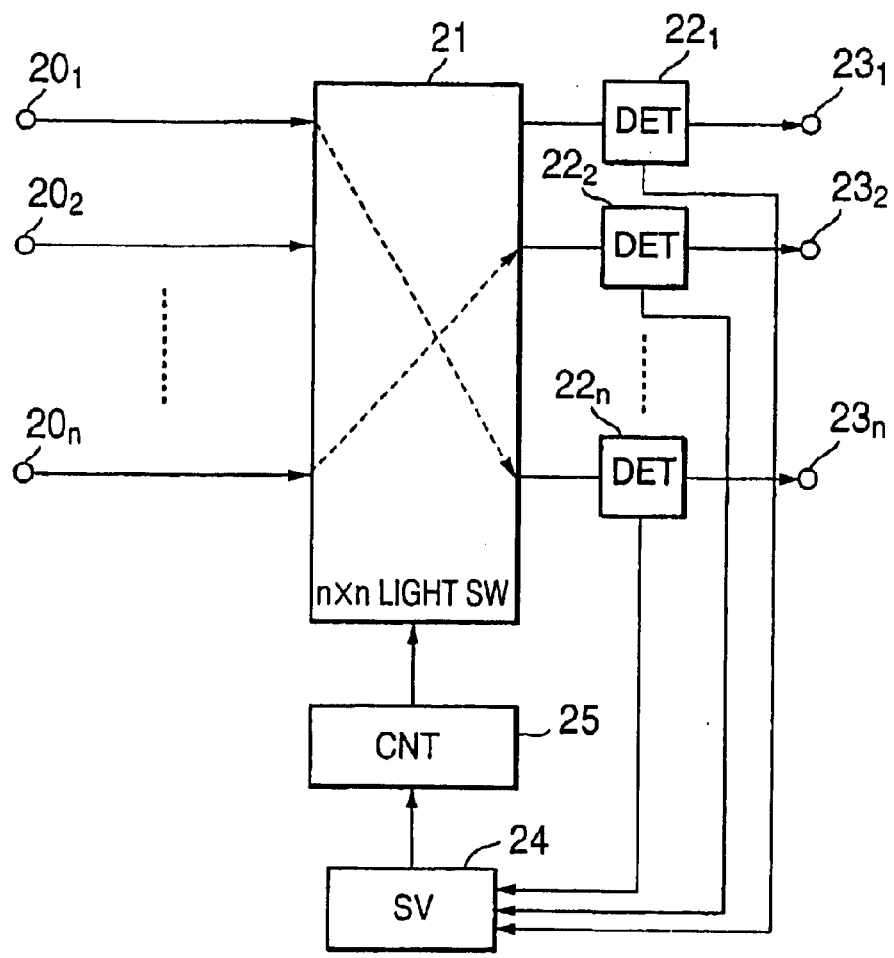
FIG. 33 is a block diagram showing an overview of a configuration of a conventional OXC.

Next, operation of OXC in such fifth embodiment will be concretely described by referring to FIG. 31.

FIG. 31 represents, as a concept, a branch connection state in the OXC in the fifth embodiment. However, as to the portions that are the same as the OXC shown in FIG. 30, the same symbols are given and description is omitted. Here, it is assumed that path setting is performed so that the first service signal inputted from an input side port of input side port number "1" of m×m light SW224 is outputted from an output side port of output side port number "2" of m×m light SW224. To be more specific, light signals inputted from upward light signal input terminal $220_1$ are outputted by a circulator $225_1$ to an input side port of input side port number "1" of m×m light SW224, and then path switching is performed so as to be outputted from an output side port of output side port number "2". Light signals outputted from an output side port of output side port number "2" of m×m light SW224 are outputted by light circulator $226_2$ to upward light signal output terminal $222_2$. Also, light signals inputted from downward light signal input terminal $223_2$ are outputted by a circulator $226_2$ to an output side port of output side port number "2" of m×m light SW224, and then path switching is performed so as to be outputted from an input side port of input side port number "1". Light signals outputted from an input side port of input side port number "1" of m×m light SW224 are outputted by a circulator $225_1$ to downward light signal output terminal $221_2$.

In the case where this OXC has upward service signal 231 inputted from upward light signal input terminal $220_1$ to be supervised, path setting is performed for m×m light SW42 by CNT 230 so that upward service signal 231 is simultaneously outputted from output side port numbers "2, " "m" of m×m light SW224 (branch connection state). Likewise, in the case where downward service signal 232 inputted from downward light signal input terminal $223_2$ is to be supervised, path setting is performed for m×m light SW224 by CNT 230 so that downward service signal 232 is simultaneously outputted from input side port numbers "1," "m" of m×m light SW224 (branch connection state).

This branch connection state allows an upward service signal to be outputted from upward light signal output terminal $222_2$, and also allows quality and management information of the upward service signal to be detected at DET 228 and supervised at SV 229. Likewise, it allows a downward service signal to be outputted from downward light signal output terminal $221_1$, and also allows quality and management information of the downward service signal to be detected at DET 227 and supervised at SV 229. Thus, if supervising of the upward service signal or downward service signal is completed, CNT 230 changes paths of m×m light SW224 so as to make the next service signal a subject of supervising.

Thus, the OXC in the fifth embodiment has light circulators $225_1$ to $225_n$, $226_1$ to $226_n$ and DET 227, 228 provided on the input side ports and output side ports of m×m light SW224 so as to transmit both upward and downward service signals and also have quality and so on of each service signal supervised in a branch connection state. Thus, as for two-way light signals, even in the case where there are a plurality of service signals to be supervised passing though the OXC, it requires only one signal detecting means and only one supervising means for the purpose of supervising the service signals in each direction, and it allows the OXC to be rendered smaller-sized and lower-cost.

As described above, according to the present invention, supervision is performed one by one in a branch state even when there are a plurality of service signals to be supervised passing through the apparatus, it requires only one signal detecting means and only one supervising means for the purpose of supervising the service signals, and thus it allows the apparatus to be rendered smaller-sized and lower-cost. It is also possible to supervise not only the service signals not to be supervised but also the service signals to be supervised without influencing the quality.

In addition, according to the present invention, a branching ratio between light signals to be supervised inputted in the light signal supervising means and signals outputted from the other second ports can be changed so that even if the levels of light signals to be supervised become lower, the levels of light signals to be originally transmitted become correspondingly higher, and thus it allows an optical cross-connect apparatus of high reliability with a supervising function to be provided.

Moreover, according to the present invention, they are outputted as-is like other light signals when supervising is not performed, so it can accommodates service signals of low priority for instance, and easily improve accommodation by effectively using the resources in the apparatus.

Furthermore, the present invention allows the apparatus to be rendered smaller-sized and lower-cost and also to easily support large-capacity transmission using the WDM technology.

In addition, the present invention allows management information placed in an overhead section of a predetermined frame format to be detected and supervised so that it can be easily applied to the existing network systems such as SDH and SONET.

Furthermore, according to the present invention, as the paths of the light switch means are branched per port in order, the optical cross-connect apparatus can supervise light signals inputted from any port one by one and in simple configuration with one detecting means and one supervising means for supervising light signals even in the case where the apparatus becomes large-sized with additional ports.

Moreover, according to the present invention, as to two-way light signals, even in the case where there are a plurality of service signals to be supervised passing though the apparatus, it requires only one signal detecting means and only one supervising means for the purpose of supervising the service signals in each direction, and thus it allows the OXC apparatus to be rendered smaller-sized and lower-cost.

What is claimed is:

1. An optical cross-connect apparatus, comprising:
   a light switch having a plurality of first and second ports, which switches paths of light signals input at each of said first ports and outputs the light signals from any one of said second ports;
   a light path control section for branching a path of said light switch so as to have the light signal input at any one of said first ports output from any two of said second ports when supervising the light signal and have the light signals input at each of said first ports output from a predetermined one of said second ports when not supervising the light signals; and
   a light signal supervising section for supervising a quality of the light signals output from either of said two second ports only when supervising the light signals.

2. The optical cross-connect apparatus according to claim 1, wherein said light signal supervising section detects and supervises management information placed in an overhead section of a predetermined frame format.

3. The apparatus of claim 1, wherein only one of said second ports has connected thereto a detector that detects one of light signal quality and light signal management information, and wherein said two second ports include the one of said second ports having said detector connected thereto.

4. The apparatus of claim 1, wherein said light path control section selects each of said first ports one at a time so that said light switch selectively directs light signals received at each of said first ports to two of said second ports, including said one second port having said detector connected thereto.

5. A signal supervising method, comprising the steps of:
   switching paths of light signals input at each of a plurality of first ports and having them outputted from any one of a plurality of second ports;
   controlling said light switching step so as to have the light signal input at any one of said first ports output from any two of said second ports when supervising the light signal and to have the light signals input at each of said first ports output from a predetermined one of said second ports when not supervising the light signals; and
   supervising a quality of the light signals output from either of said two second ports only when performing said supervising.

6. The signal supervising method according to claim 5, wherein the supervising step detects and supervises management information placed in an overhead section of a predetermined frame format.

7. The signal supervising method according to claim 6, wherein the controlling step sets a path for having the light signals output from said two second ports per port in order.

8. An optical cross-connect apparatus, comprising:
   a signal light switch having n input ports, n being at least two, and n+1 output ports, said light switch directing light signals received at one of said input ports to at least one of said output ports;
   only one of said n+1 output ports having a light signal detector connected thereto, said detector detecting at least one of light signal quality and management information; and
   a switch controller that controls said switch so that a light signal received at a selected one of said input ports is directed to two of said output ports, including said one output port having said detector connected thereto.

9. The apparatus of claim 8, wherein said switch controller selects each of said input ports one at a time so that said switch selectively directs light signals received at each of said input ports to two of said output ports, including said one output port having said detector connected thereto.

10. The apparatus of claim 8, further comprising a light signal amplifier that amplifies a light signal on the one of said two output ports not connected to said detector in response to feedback from said detector.

11. The apparatus of claim 8, further comprising a wavelength separating section for separating light signals of respective wavelength components from a multiplexed plurality of mutually different wavelength components in an input light signal, and a wavelength multiplexing section for multiplexing the output light signals.

12. A method of cross-connecting input light signals, comprising the step of:
   directing light signals received at n input ports, n being at least two, to at least one of n+1 output ports;
   detecting at least one of light signal quality and management information only at one of said n+1 output ports; and
   controlling the light signals so that a light signal received at a selected one of the input ports is directed to two of the output ports, including the one output port at which the detecting occurs.

13. The method of claim 12, wherein said controlling step includes selecting each of the input ports one at a time and selectively directing light signals received at each of the input ports to two of the output ports, including the one output port at which the detecting occurs.

14. The method of claim 12, further comprising the steps of feeding back information from a detector that performs the detecting step to a controller than performs the controlling step, and amplifying a light signal on the one of the two output ports at which the detecting does not occur in response to the feedback.

15. The method of claim 12, further comprising the steps of separating light signals of respective wavelength components from a multiplexed plurality of mutually different wavelength components in an input light signal, and multiplexing the output light signals.

16. An optical cross-connect apparatus, comprising:
   a signal light switch having n first ports, n being at least two, and n second ports, said light switch directing light signals received at one of said first ports to at least one of said second ports and directing light signals received at one of said second ports to at least one of said first ports;

only one of said first ports having a light signal detector connected thereto and only one of said second ports having a light signal detector connected thereto, said detector detecting at least one of light signal quality and management information; and a switch controller that controls said switch so that a light signal received at a selected one of said first ports is directed to two of said second ports, including said one second port having said detector connected thereto, and so that a light signal received at a selected one of said second ports is directed to two of said first ports, including said one first port having said detector connected thereto.

* * * * *